United States Patent
Ma et al.

(10) Patent No.: US 9,832,063 B2
(45) Date of Patent: *Nov. 28, 2017

(54) PREAMBLES IN OFDMA SYSTEM

(71) Applicant: Apple Inc., Cupertino, CA (US)

(72) Inventors: Jianglei Ma, Kanata (CA); Hang Zhang, Nepean (CA); Wen Tong, Ottawa (CA); Ming Jia, Ottawa (CA); Peiying Zhu, Kanata (CA); Mo-Han Fong, L'Orignal (CA)

(73) Assignee: APPLE INC., Cupertino, CA (US)

( * ) Notice: Subject to any disclaimer, the term of this patent is extended or adjusted under 35 U.S.C. 154(b) by 539 days.

This patent is subject to a terminal disclaimer.

(21) Appl. No.: 13/680,173

(22) Filed: Nov. 19, 2012

(65) Prior Publication Data
US 2013/0077468 A1     Mar. 28, 2013

Related U.S. Application Data

(60) Continuation of application No. 13/114,579, filed on May 24, 2011, now Pat. No. 8,340,072, which is a
(Continued)

(51) Int. Cl.
*H04L 27/26* (2006.01)
*H04B 7/02* (2017.01)
(Continued)

(52) U.S. Cl.
CPC ........... *H04L 27/2692* (2013.01); *H04B 7/02* (2013.01); *H04B 7/0452* (2013.01);
(Continued)

(58) Field of Classification Search
CPC . H04L 5/0048; H04L 5/0007; H04L 25/0204; H04L 27/2607; H04L 27/2647;
(Continued)

(56) References Cited

U.S. PATENT DOCUMENTS 6,185,258 B1   2/2001   Alamouti et al. ....... H04K 1/10
6,747,959 B1   6/2004   Ho
(Continued)

FOREIGN PATENT DOCUMENTS

CN   1267153   9/2000
CN   1479983   3/2004
(Continued)

OTHER PUBLICATIONS

Kim, Kwang Soon et al., "A Preamble-Based Cell Searching Technique for OFDM Cellular Systems," 2003 IEEE 58th Vehicular Technology Conference, Orlando, Florida, Oct. 6-9, 2003, XP010702613, pp. 2471-2475.
(Continued)

*Primary Examiner* — Kwang B Yao
*Assistant Examiner* — Ricardo Castaneyra
(74) *Attorney, Agent, or Firm* — Fay Kaplun & Marcin, LLP

(57) ABSTRACT

The present invention provides a preamble that is inserted into an OFDMA frame and has a common sequence for all the base stations participating in a transmission. The subscriber station performs fine synchronization using the common sequence on the common preamble, and the resulting peaks will provide the locations of candidate base stations. The base station specific search is then performed in the vicinities of those peaks by using base station specific pseudo-noise sequences. With this two stage cell search, the searching window is drastically reduced. The preamble is matched to known values by a respective receiver to decode the signals and permit multiple signals to be transferred from the transmitter to the receiver. The preamble may comprise two parts, Preamble-1 and Preamble-2, which may be used in different systems, including multioutput, multi-input (MIMO) systems.

20 Claims, 25 Drawing Sheets

Related U.S. Application Data division of application No. 11/630,474, filed as application No. PCT/CA2005/000987 on Jun. 23, 2005, now Pat. No. 7,961,696.

(60) Provisional application No. 60/582,298, filed on Jun. 24, 2004, provisional application No. 60/598,660, filed on Aug. 4, 2004.

(51) Int. Cl.
| | |
|---|---|
| *H04L 5/00* | (2006.01) |
| *H04W 24/02* | (2009.01) |
| *H04B 7/0452* | (2017.01) |
| *H04L 7/04* | (2006.01) |

(52) U.S. Cl.
CPC .......... *H04L 5/0007* (2013.01); *H04L 5/0023* (2013.01); *H04L 5/0048* (2013.01); *H04L 7/043* (2013.01); *H04L 27/265* (2013.01); *H04L 27/2613* (2013.01); *H04L 27/2655* (2013.01); *H04L 27/2686* (2013.01); *H04W 24/02* (2013.01)

(58) Field of Classification Search
CPC . H04L 5/0053; H04L 27/2626; H04W 72/042
USPC ....... 370/210, 344, 338, 329, 252, 281, 238, 370/208, 336, 203, 332, 350; 455/456.1, 455/450, 517; 375/316, 145, 354
See application file for complete search history.

(56) References Cited

U.S. PATENT DOCUMENTS

| | | | |
|---|---|---|---|
| 6,760,882 B1 * | 7/2004 | Gesbert et al. ............... 714/774 |
| 7,050,768 B2 | 5/2006 | Hosur et al. | |
| 7,142,584 B1 | 11/2006 | Bomer et al. | |
| 7,233,625 B2 | 6/2007 | Ma et al. | |
| 7,310,304 B2 | 12/2007 | Mody et al. | |
| 7,327,800 B2 | 2/2008 | Oprea et al. | |
| 7,466,773 B2 | 12/2008 | Hansen et al. | |
| 7,532,563 B1 | 5/2009 | Shirali et al. | |
| 7,548,506 B2 | 6/2009 | Ma et al. | |
| 7,551,546 B2 | 6/2009 | Ma et al. | |
| 7,619,964 B2 | 11/2009 | Son et al. | |
| 7,696,204 B2 | 4/2010 | McDonald et al. | |
| 2001/0019592 A1 | 9/2001 | Solondz | |
| 2002/0041635 A1 * | 4/2002 | Ma et al. ...................... 375/267 |
| 2003/0053487 A1 | 3/2003 | Hamalainen et al. .... H04J 3/18 |
| 2003/0072255 A1 * | 4/2003 | Ma et al. ...................... 370/208 |
| 2003/0210646 A1 | 11/2003 | Ohseki et al. | |
| 2003/0218973 A1 * | 11/2003 | Oprea et al. ................. 370/210 |
| 2003/0231706 A1 | 12/2003 | Hwang .................... H04B 1/38 |
| 2004/0001427 A1 * | 1/2004 | Belotserkovsky et al. ... 370/208 |
| 2004/0130487 A1 | 7/2004 | Hoffmann et al. | |
| 2004/0131011 A1 | 7/2004 | Sandell et al. | |
| 2004/0156309 A1 | 8/2004 | Chadha et al. | |
| 2004/0170197 A1 | 9/2004 | Mehta | |
| 2004/0202103 A1 * | 10/2004 | Suh et al. ..................... 370/208 |
| 2004/0257981 A1 * | 12/2004 | Ro et al. ...................... 370/210 |
| 2005/0013238 A1 | 1/2005 | Hansen | |
| 2005/0136933 A1 * | 6/2005 | Sandhu et al. ............... 455/450 |
| 2005/0259567 A1 * | 11/2005 | Webster et al. .............. 370/208 |
| 2006/0025079 A1 * | 2/2006 | Sutskover et al. ......... 455/67.11 |
| 2006/0114812 A1 * | 6/2006 | Kim et al. .................... 370/206 |

FOREIGN PATENT DOCUMENTS

| | | | |
|---|---|---|---|
| CN | 1479983 A | 3/2004 | ............... H04L 1/00 |
| EP | 1 043 861 | 10/2000 | |
| EP | 1 357 689 | 10/2003 | |
| WO | 02/43314 | 5/2002 | |
| WO | 2004049618 | 6/2004 | |

OTHER PUBLICATIONS

Tong, Wen et al., "Enhancement of fast cell search and reduced complexity for cell search," IEEE 802.16 Broadband Wireless Access Working Group, May 17, 2004, http://www.ieee802.org/16/tge/contrib/C80216e-04_115.pdf, pp. 1-2.

Tong, Wen et al., "Fast cell search for OFDMA," IEEE 802.16 Broadband Wireless Access Working Group, Jul. 7, 2004, http://www.ieee802.org/16/tge/contrib/C80216e-04_115r2.pdf, pp. 1-6.

Extended European Search Report for European Application No. 05759545.6 dated Feb. 4, 2010, pp. 1-4.

International Search Report for PCT/CA2005/000987 dated Oct. 13, 2005, 3 pages.

Election/Restriction Requirement dated Jul. 1, 2010, for U.S. Appl. No. 11/630,474, 4 pages.

Non-Final Rejection dated Aug. 17, 2010, for U.S. Appl. No. 11/630,474, 16 pages.

Notice of Allowance dated Feb. 2, 2011, for U.S. Appl. No. 11/630,474, 7 pages.

Extended Supplemental European Search Report for application 12150556.4, dated Feb. 20, 2012, 12 pages.

Eklund C et al: "IEEE Standard 802. 16: A Technical Overview of the Wirelessman Air Interface for Broadband Wireless Access", IEEE Communication Magazine, IEEE Service Center, Piscatway. US, vol. 40, No. 6, Jun. 1, 2002 (Jun. 1, 2002), pp. 98-107, XP001123517, ISSN: 0163-6804, DOI: 10.1109/ MCOM. 2002. 1007415.

"Enhanced MAC Support for MIMO OFDMA; C80216e-04_99r1", IEEE Draft: C80216E-04_96R1, IEEE-SA, Piscataway, NY USA, vol. 802. 16e, May 19, 2004 (May 19, 2004), pp. 1-7, XP017623817.

Ye (Geoffrey) Li et al: "Transmitter Diversity for OFDM Systems and Its Impact on High-Rate Data Wireless Networks", IEEE Journal on Selected Areas in Communications, IEEE Service Center, Piscataway, US, vol. 17, No. 7, Jul. 1, 1999 (Jul. 1, 1999 ), XP011054988, ISSN: 0733-8716.

Al-Dhahir N et al: "Algebraic properties of space-time block codes in intersymbol interference multiple-access channels", IEEE Transactions on Information Theory, IEEE Press, USA, vol. 49, No. 10, Oct. 1, 2003 (Oct. 1, 2003 ), pp. 2403-2414, XP011102230, ISSN: 0018-9448, DOI: 10.1109/TIT.2003.817833.

Kawamoto J et al: "Comparison of space division multiplexing schemes employing multiple antennas in OFDM forward link", Vehicular Technology Conference, 2003. VTC 2003-Fall. 2003 IEEE 58th Orlando, FL, USA Oct. 6-9, 2003;[IEEE Vehicular Technology Conference], Piscataway, NJ, USA, IEEE, US, Oct. 6, 2003 (Oct. 6, 2003), pp. 452-457vol.1, XP010701016, DOI: 10.1109/VETECF.2003.1285058 ISBN: 978-0-7803-7954-1.

* cited by examiner (a)

(b)

(c)

(d)

(a)

FUSC (b)

PUSC

PREAMBLES IN OFDMA SYSTEM

CROSS-REFERENCE TO RELATED APPLICATIONS

This application is a continuation of U.S. application Ser. No. 13/114,579, filed on May 24, 2011, entitled "Preambles in OFDMA System," which is a divisional of U.S. patent application Ser. No. 11/630,474, filed on Jul. 23, 2007, entitled "PREAMBLES IN OFDMA SYSTEM", which is a National Phase filing of PCT/CA2005/000987, which claims the benefit of priority to U.S. Provisional Application No. 60/582,298, filed on Jun. 24, 2004, and to U.S. Provisional Application No. 60/598,660, filed on Aug. 4, 2004. All of the above-identified applications are hereby incorporated by reference in their entireties as though fully and completely set forth herein.

FIELD OF THE INVENTION

The present invention relates to the delivery of data via a wireless connection and, more particularly, to the accurate delivery of data at high rates via a wireless connection.

BACKGROUND OF THE INVENTION

Recent growth in demand for broadband wireless services enables rapid deployment of innovative, cost-effective, and interoperable multi-vendor broadband wireless access products, providing alternatives to wire line broadband access for applications such as telephony, personal communications systems (PCS) and high definition television (HDTV). At the same time, broadband wireless access has been extended from fixed to mobile subscriber stations, for example at vehicular speed. Though the demand for these services is growing, the channel bandwidth over which the data may be delivered is limited. Therefore, it is desirable to deliver data at high speeds over this limited bandwidth in an efficient, as well as cost effective, manner.

In the ever-continuing effort to increase data rates and capacity of wireless networks, communication technologies evolve. An encouraging solution for the next generation broadband wireless access delivering high speed data over a channel is by using Orthogonal Frequency Division Multiplexing (OFDM). The high-speed data signals are divided into tens or hundreds of lower speed signals that are transmitted in parallel over respective frequencies within a radio frequency (RF) signal that are known as subcarrier frequencies ("subcarriers"). The frequency spectra of the subcarriers may overlap so that the spacing between them is minimized. The subcarriers are also orthogonal to each other so that they are statistically independent and do not create crosstalk or otherwise interfere with each other. When all of the allocated spectrum can be used by all base stations, the channel bandwidth is used much more efficiently than in conventional single carrier transmission schemes such as AM/FM (amplitude or frequency modulation), in which only one signal at a time is sent using only one radio frequency, or frequency division multiplexing (FDM), in which portions of the channel bandwidth are not used so that the subcarrier frequencies are separated and isolated to avoid inter-carrier interference (ICI).

In OFDM, each block of data is converted into parallel form and mapped into each subcarrier as frequency domain symbols. To get time domain signals for transmission, an inverse discrete Fourier transform or its fast version, IFFT, is applied to the symbols. The symbol duration is much longer than the length of the channel-impulse response so that inter-symbol interference is avoided by inserting a cyclic prefix for each OFDM symbol. Thus, OFDM is much less susceptible to data loss caused by multipath fading than other known techniques for data transmission. Also, the coding of data onto the OFDM subcarriers takes advantage of frequency diversity to mitigate loss from frequency-selective fading when forward error correction (FEC) is applied.

Another approach to providing more efficient use of the channel bandwidth is to transmit the data using a base station having multiple antennas and then receive the transmitted data using a remote station having multiple receiving antennas, referred to as Multiple Input-Multiple Output (MIMO). The data may be transmitted such there is spatial diversity between the signals transmitted by the respective antennas, thereby increasing the data capacity by increasing the number of antennas. Alternatively, the data is transmitted such that there is temporal diversity between the signals transmitted by the respective antennas, thereby reducing signal fading.

In orthogonal frequency division multiplexing access (OFDMA) systems, multiple users are allowed to transmit simultaneously on the different subcarriers per OFDM symbol. In an OFDMA/TDMA embodiment, for example, the OFDM symbols are allocated by time division multiplexing access (TDMA) method in the time domain, and the subcarriers within an OFDM symbols are divided in frequency domain into subsets of subcarriers, each subset is termed a subchannel.

In OFDMA system, a preamble may be used to provide: base station identification and selection, CIR measurement, framing and timing synchronization, frequency synchronization as well as channel estimation.

Currently preamble is specified only for single antenna transmission, and does not provide a way to efficiently estimate channels from multiple base station antennas in MIMO environment. The ability to measure the channel quality in the entire bandwidth is beneficial, if each subscriber station scans the entire frequency bandwidth and selects the best band to be used in the subsequent frames. Since the channels seen from different transmit antennas are more or less uncorrelated, choosing the best band based only on a channel from a single transmit antenna is far from being optimal.

In addition, the current preamble per IEEE 802.16-2004 is designed primarily for fixed deployment. The preamble search requires a large amount of computation power at the subscriber station for system access and for cell selection and reselection to support the device mobility in a multi-cell deployment scenarios and to perform frequency domain fine synchronization. For the initial cell search, there is no prior knowledge about the synchronization positions for potential base station candidates; hence the subscriber station needs to perform the correlations with all possible pseudo noise (PN) sequences for each Fourier fast transform (FFT) window position within the entire searching window. Such a window could be large even for the synchronous base station network. For handoff, even with the presence of the adjacent base station list, information broadcast from the anchoring base station, the preamble search is of excessively high computational complexity.

It is therefore desirable to provide preambles enabling easy, fast synchronization between the subscriber station and the base stations, supporting channel estimation in MIMO environment; being compatible with non-MIMO subscriber stations; and providing low complexity and fast cell search by fine tuning after coarse synchronization.

Accordingly, there is a need for an improved preamble design, method and apparatus which are suitable for the mobile, broadband wireless access systems. It is further desirable to provide an improved preamble design, method and apparatus to a MIMO OFDMA system.

SUMMARY OF THE INVENTION

The present invention provides a preamble that is inserted periodically into OFDMA frames and has a common sequence for all the base stations participating in a transmission. The subscriber station performs fine synchronization using the common sequence on the common preamble, and the resulting peaks will provide the locations of candidate base stations. The base station specific search is then performed in the vicinities of those peaks by using base station specific pseudo-noise sequences. With this two stage cell search, the searching window is drastically reduced. The preamble is matched to known values by a respective receiver to decode the signals and permit multiple signals to be transferred from the transmitter to the receiver. The preamble may comprise two parts, Preamble-1 and Preamble-2, which may be used in different systems, including multi-output, multi-input (MIMO) systems.

In accordance with one aspect of the present invention there is provided a method for accessing an orthogonal frequency division multiplexing access (OFDMA) system comprising the steps of: a) constructing an OFDMA frame having a training sequence; b) assigning said training sequence for use in a plurality of base stations, c) transmitting said training sequence by said plurality of base stations; and d) detecting said training sequence at said subscriber station; e) performing synchronization at said subscriber station using said training sequence.

In one embodiment, the training sequence is a first preamble having a common synchronization channel comprising common synchronization subcarriers, said common synchronization subcarriers carries a common sequence; said common sequence provides locations of candidate base stations, and reduces a search window for base station specific preamble.

In another embodiment, the training sequence is a second preamble, said second preamble comprising cell-specific synchronization subcarriers, and the method further comprising the step of assigning said preamble for use in said plurality of base stations and performing cell search at said subscriber station.

In accordance with another aspect of the present invention there is provided an orthogonal frequency division multiplexing access (OFDMA) system comprising: a) a base station controller adapted to schedule data being transmitted; b) a plurality of base stations operatively associated with said base station controller, each base station being adapted to receive at least a portion of scheduled data from said base station controller, and to transmit a plurality of orthogonal frequency division multiplexing (OFDM) symbols to said subscriber station; said plurality of base stations transmitting an OFDMA frame having a training sequence; and c) a subscriber station using said training sequence to provide locations of candidate base stations.

In one embodiment, the training sequence is a first preamble having a common synchronization channel comprising common synchronization subcarriers, said common synchronization subcarriers carries a common sequence, said common sequence provides locations of candidate base stations, and reducing a search window for base station specific preamble.

In another embodiment, the training sequence is a second preamble, said second preamble comprising cell-specific synchronization subcarriers, said second preamble is assigned for use in said plurality of base stations and performing cell search at said subscriber station.

In accordance with another aspect of the present invention there is provided a base station in an orthogonal frequency division multiplexing access (OFDMA) system comprising: a) a training sequence configuring logic for generating a training sequence, said training sequence having a plurality of subcarriers; b) Inverse Fourier Transform (IFT) logic adapted to provide an IFT on each of said subcarriers to generate a plurality of OFDM symbols; and c) transmit circuitry having transmitting said plurality of OFDM signals for reception by a subscriber station; said subscriber station performing synchronization using said training sequence.

In accordance with another aspect of the present invention there is provided a subscriber station in an orthogonal frequency division multiplexing access (OFDMA) system comprising: a) receive circuitry adapted to receive and downconvert a plurality of OFDM signals, said plurality of OFDM symbols forming an OFDMA frame having a training sequence; b) Fourier Transform (FT) logic adapted to provide a FT on each of said plurality of OFDM signals to generate a plurality of divided-multiplexed coded signals; and c) decoder logic adapted to provide division-multiplexing decoding on said plurality of divided-multiplexed coded signals to recover data from a plurality of base stations.

BRIEF DESCRIPTION OF THE DRAWING FIGURES

The invention and the illustrated embodiments may be better understood, and the numerous objects, advantages, and features of the present invention and illustrated embodiments will become apparent to those skilled in the art by reference to the accompanying drawings. In the drawings, like reference numerals refer to like parts throughout the various views of the non-limiting and non-exhaustive embodiments of the present invention, and wherein:

FIG. 6 (b) shows an example of an example of a basic structure of an OFDMA symbol in frequency domain;

FIG. 9 (b) shows an example of a tile;

FIG. 10 (b) illustrates an embodiment of the present invention of an OFDMA frame with Preamble-1 and Preamble-2;

FIG. 10 (c) illustrates another embodiment of Preamble-1 and Preamble-2 in different OFDMA frames;

FIG. 10 (d) illustrates another embodiment of Preamble-1 and Preamble-2 in an OFDMA frame;

FIG. 10 (e) illustrates another embodiment of Preamble-1 and two Preambles-2 in an OFDMA frame;

FIG. 11 (b) shows another embodiment of Preamble-1 at the end of an OFDMA frame;

FIG. 11 (c) shows another embodiment of Preamble-1 in an OFDMA frame, at a predefined location;

FIG. 12 (b) shows an example of the structure of Preamble-1 in PUSC mode in frequency domain;

FIG. 12 (c) shows an example of the structure of Preamble-1 in time domain after IFFT;

FIG. 13 (b) shows an example of a primary common synchronization channel and a secondary common synchronization channel in PUSC mode;

FIG. 15 (b) depicts an example of Preamble-2 structure for FFT sizes 128, 256, and 512 transmissions in FUSC mode;

FIG. 15 (c) shows an example of a time plan representation of the scalable synchronization performance of the Preamble-2.

FIG. 16 (b) depicts an example of Preamble-2 structure for FFT sizes 128, 256, and 512 transmissions in PUSC mode at different times $t_1$ and $t_2$;

FIG. 18 (b) shows an example of Walsh code and antenna mapping in PUSC mode;

FIG. 18 (c) shows an example of Walsh chip mapping onto subcarriers in time direction;

FIG. 18 (d) shows an example of Walsh chip mapping onto subcarriers in both time and frequency direction;

FIG. 19 (b) depicts an example of Steiner approach for cyclic shift in time for Preamble-2 in PUSC mode.

FIG. 20 (b) is an example of a hybrid transmission of Preamble-2 for FFT sizes 128, 256, and 512 transmissions in FUSC mode;

FIG. 20 (c) shows an example of relation between the antenna and segment mapping;

FIG. 21 (b) shows an example of single receive antenna search and demodulation for Preamble-1 and DL_MAP;

DETAILED DESCRIPTION OF THE PREFERRED EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

The term "subscriber station" is intended to include any device which may provide connectivity between subscriber equipment and a base station (BS). A subscriber station may be fixed, or mobile. When the subscriber station is mobile, the speed of its mobile carrier should be apparent to a person skilled in the art, for example, the speed of an automobile, an aircraft or a satellite. The term "base station" is intended to include generalized equipment set providing connectivity, management, and control of the subscriber station (SS). The term "protocol data unit" (PDU) is intended to describe a data unit exchanged between peer entities of the same protocol layer. The term "service data unit" (SDU) is intended to describe a data unit exchanged between two adjacent protocol layers.

Figure 1:
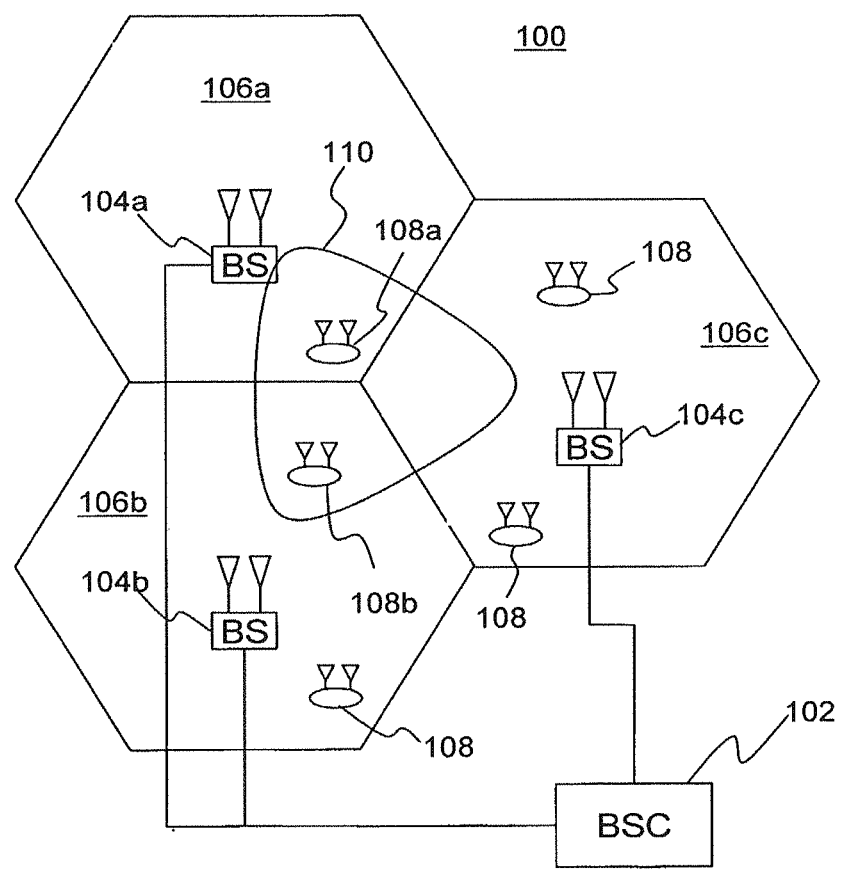
FIG. 1 is a block representation of a cellular communication system.

Referring to FIG. 1, in a wireless communication system 100 a base station controller (BSC) 102 controls base stations (BS) 104 within corresponding cells 106. In general, each base station 104 will facilitate communications with subscriber stations 108, which are within the cell 106 associated with the corresponding base station 104. As a subscriber station 108 moves from a first cell 106a to a second cell 106b, communications with the subscriber station 108 transition from one base station 104 to another. The term "handoff" is generally used to refer to techniques for switching from one base station 104 to another during a communication session with a subscriber station 106. The base stations 104 cooperate with the base station controller 102 to ensure that handoffs are properly orchestrated, and that data intended for the subscriber station 108 is provided to the appropriate base station 104 currently supporting communications with the subscriber station 108.

In FIG. 1, a handoff area 110 is illustrated at the junction of three cells 106, wherein a subscriber station 108b is at the edge of any one of the three cells 106 and could potentially be supported by any of the base stations 104a, 104b and 104c within those cells 106a, 106b and 106c. The present invention provides a method and architecture for preambles used in orthogonal frequency division multiplexing access (OFDMA) wireless communication environment. Orthogonal frequency division multiplexing access (OFDMA) allows multiple users, for example subscriber station 108a and 108b, to transmit simultaneously on the different subcarriers per OFDM symbol. The subcarriers within an OFDM symbols are divided by OFDMA method in frequency domain into subsets of subcarriers, which is termed a subchannel. These subchannels are the basic allocation unit. Each allocation of subchannel may be allocated for several OFDM symbols in such a way that the estimation of each subchannel is done in frequency and time. The subchannel may be spread over the entire bandwidth. Therefore, in the OFDMA/TDMA embodiment, OFDM symbols are shared both in time and in frequency (by subchannel allocation) between different users. As it will be described later, an SHO zone having the same subchannel definition, for example, permutation code could be defined to facilitate the handoff, to provide RF combining, to reduce interference; and to provide selection combining.

Figure 2:
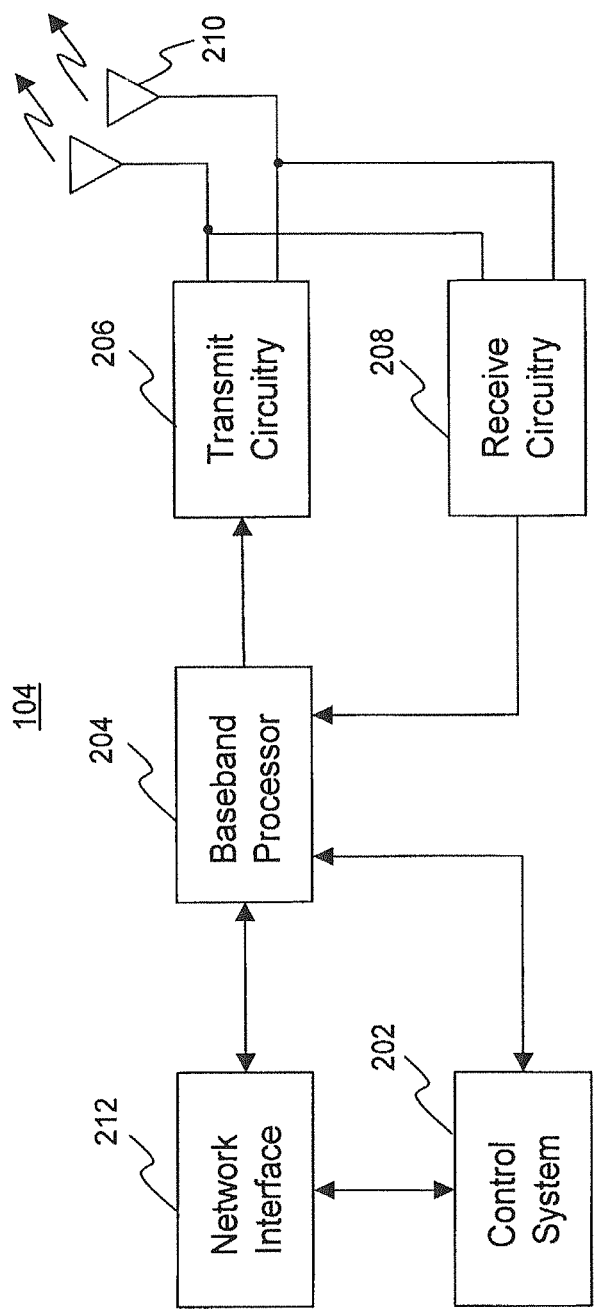
FIG. 2 is a block representation of a base station according to one embodiment of the present invention.

A high level overview of the subscriber stations 108 and base stations 104 of the present invention is provided prior to delving into the structural and functional details of the preferred embodiments. With reference to FIG. 2, a base station 104 configured according to one embodiment of the present invention is illustrated. The base station 104 generally includes a control system 202, a baseband processor 204, transmit circuitry 206, receive circuitry 208, multiple antennas 210, and a network interface 212. The receive circuitry 208 receives radio frequency signals bearing information from one or more remote transmitters provided by subscriber stations 108 (illustrated in FIG. 3). Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 204 processes the digitized received signal to extract the information or data bits conveyed in the received signal. This processing typically comprises demodulation, decoding, and error correction operations. As such, the baseband processor 204 is generally implemented in one or more digital signal processors (DSPs). The received information is then sent across a wireless network via the network interface 212 or transmitted to another subscriber station 108 serviced by the base station 104. The network interface 212 will typically interact with the base station controller and a circuit-switched network forming a part of a wireless network, which may be coupled to the public switched telephone network (PSTN) or Internet Protocol (IP) network.

On the transmit side, the baseband processor 204 receives digitized data, which may represent voice, data, or control information, from the network interface 212 under the control of control system 202, which encodes the data for transmission. The encoded data is output to the transmit circuitry 206, where it is modulated by a carrier signal having a desired transmit frequency or frequencies. A power amplifier (not shown) will amplify the modulated carrier signal to a level appropriate for transmission, and deliver the modulated carrier signal to the antennas 210 through a matching network (not shown). Modulation and processing details are described in greater detail below.

Figure 3:
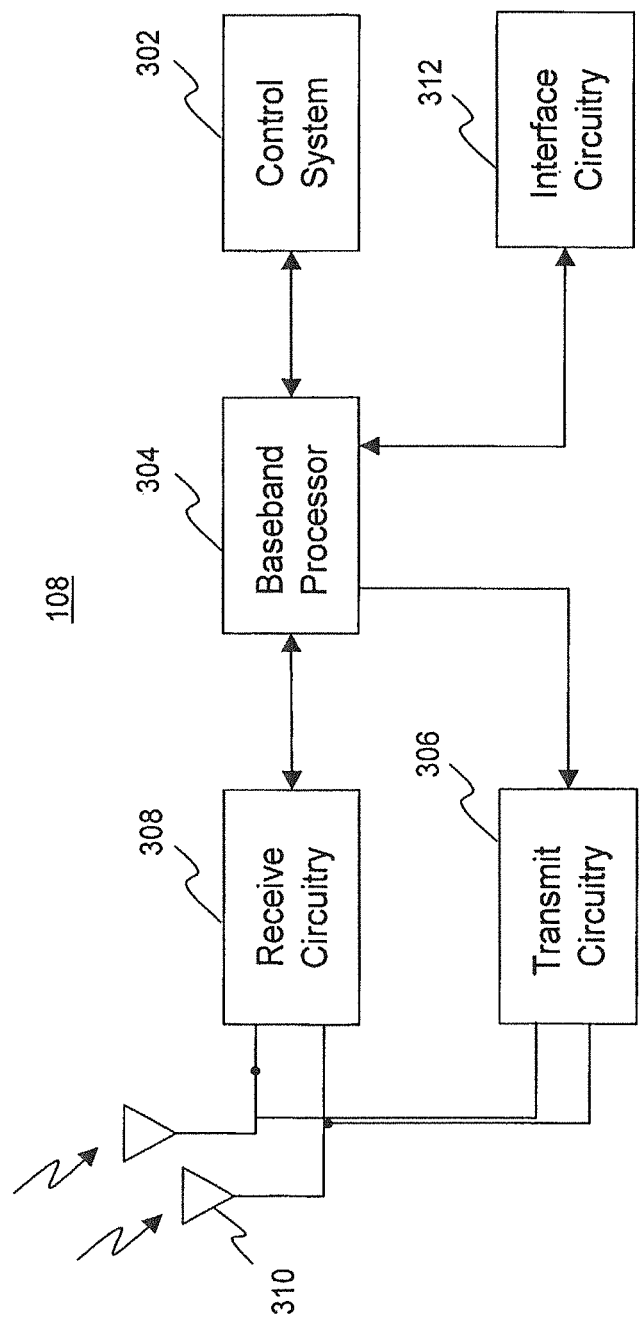
FIG. 3 is a block representation of a subscriber station according to one embodiment of the present invention.

With reference to FIG. 3, a subscriber station 108 configured according to one embodiment of the present invention is illustrated. Similarly to the base station 104, the subscriber station 108 will include a control system 302, a baseband processor 304, transmit circuitry 306, receive circuitry 308, multiple antennas 310, and user interface circuitry 312. The receive circuitry 308 receives radio frequency signals bearing information from one or more base stations 104. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 304 processes the digitized received signal to extract the information or data bits conveyed in the received signal. This processing typically comprises demodulation, decoding, and error correction operations, as will be discussed in greater detail below. The baseband processor 304 is generally implemented in one or more digital signal processors (DSPs) and application specific integrated circuit (ASIC).

For transmission, the baseband processor 304 receives digitized data, which may represent voice, data, or control information, from the control system 302, which it encodes for transmission. The encoded data is output to the transmit circuitry 305, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are applicable to the present invention.

In OFDM modulation, the transmission band is divided into multiple, orthogonal carrier waves. Each subcarrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation requires the performance of an Inverse Fast Fourier Transform (IFFT) on the information to be transmitted. For demodulation, the performance of a Fast Fourier Transform (FFT) on the received signal is required to recover the transmitted information. In practice, the Inverse Discrete Fourier Transform (IDFT) and Discrete Fourier Transform (DFT) may be implemented using digital signal processing for modulation and demodulation, respectively.

Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

Figure 4:
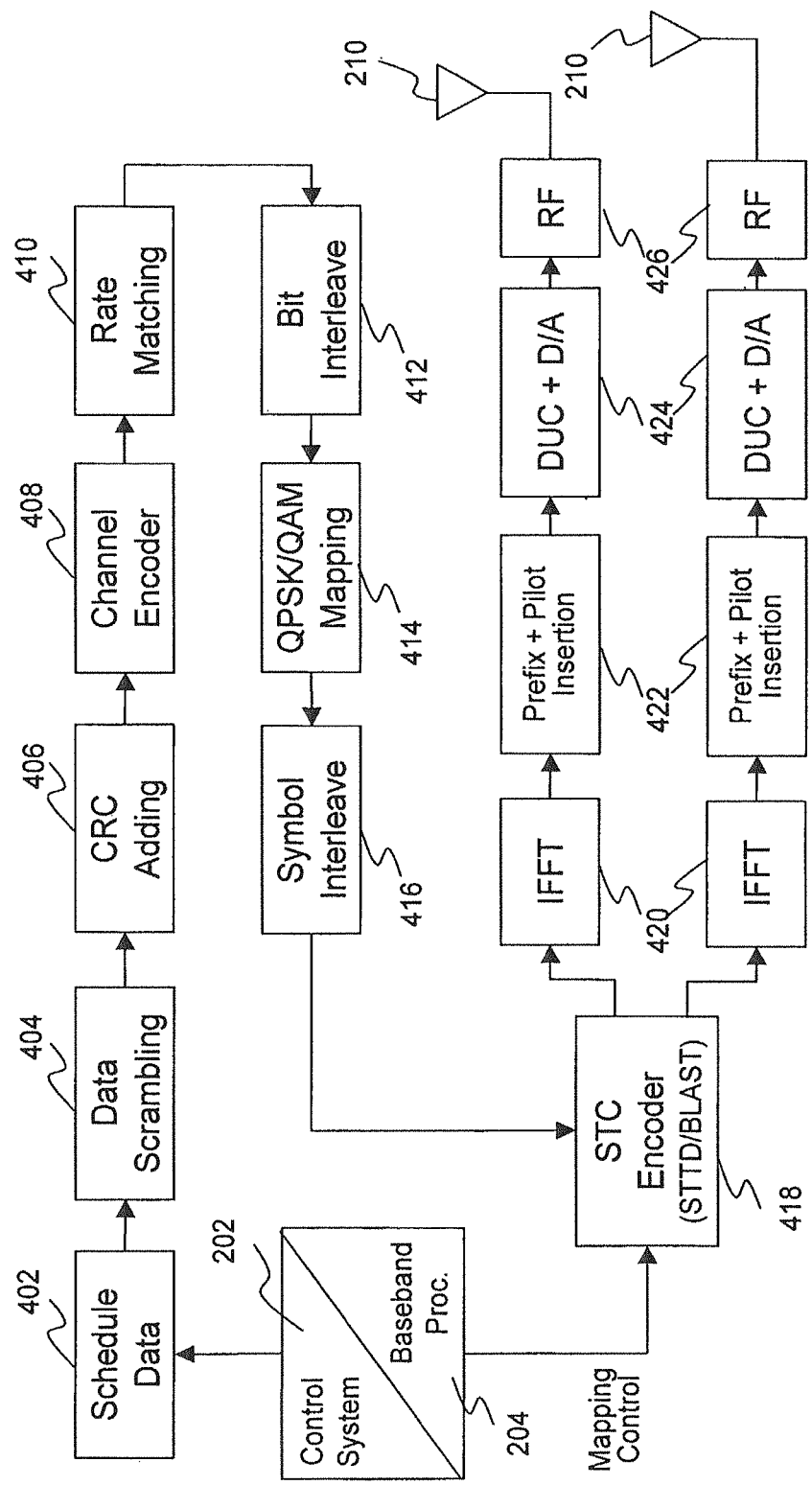
FIG. 4 is a logical breakdown of an OFDMA transmitter architecture according to one embodiment of the present invention.

With reference to FIG. 4, a logical OFDM transmission architecture is provided according to one embodiment. Initially, data 402 to be transmitted to a subscriber station 108 is received at the base station 104. The data is scrambled in a manner reducing the peak-to-average power ratio associated with the data using data scrambling logic 404. A cyclic redundancy check (CRC) for the scrambled data is determined and appended to the scrambled data using CRC logic 406. Next, channel coding is performed using channel encoder logic 408 to effectively add redundancy to the data to facilitate recovery and error correction at the subscriber station 108. The channel encoder logic 408 may use forward error correction techniques such as Concatenated Reed-Solomon-convolutional code (RS-CC), block turbo coding (BTC) or convolutional turbo codes (CTC). The encoded data is then processed by rate matching logic 410 to compensate for the data expansion associated with encoding.

Bit interleaver logic 412 systematically reorders the bits in the encoded data to ensure that adjacent coded bits are mapped onto nonadjacent subcarriers, thereby minimize the loss of consecutive data bits. This is considered the first step of a two step permutation. All encoded data bits shall be interleaved by a block interleaver with a block size corresponding to the number of coded bits per allocated subchannels per OFDM symbol. The second step ensures that adjacent coded bits are mapped alternately onto less or more significant bits of the constellation, thus avoiding long runs of lowly reliable bits.

The resultant data bits are mapped into corresponding symbols depending on the chosen baseband modulation by mapping logic 414. Binary Phase Shift Key (BPSK), Quadrature Amplitude Modulation (QAM), for example, 16-QAM and 64-QAM, or Quadrature Phase Shift Key (QPSK), for example, Gray mapped QPSK modulation may be used. When QAM is used, the subchannels are mapped onto corresponding complex-valued points in a $2^m$-ary constellation. A corresponding complex-valued $2^m$-ary QAM sub-symbol, $c_k = a_k + jb_k$, that represent a discrete value of phase and amplitude, where $-N \leq k \leq N$, is assigned to represent each of the sub-segments such that a sequence of frequency-domain sub-symbols is generated.

Each of the complex-valued, frequency-domain sub-symbols $c_k$ is used to modulate the phase and amplitude of a corresponding one of 2N+1 subcarrier frequencies over a symbol interval $T_s$.

The modulated subcarriers are each modulated according to a sine x=(sin x)/x function in the frequency domain, with a spacing of $1/T_s$ between the primary peaks of the subcarriers, so that the primary peak of a respective subcarrier coincides with a null the adjacent subcarriers. Thus, the modulated subcarriers are orthogonal to one another though their spectra overlap.

The symbols may be systematically reordered to further bolster the immunity of the transmitted signal to periodic data loss caused by frequency selective fading using symbol interleaver logic 416. For this purpose, specific Reed-Solomon permutation may be used to make the subchannels as independent as possible from each other. The independence of the subchannel allocation gives maximum robustness and statistically spreading interference between neighboring cells as well as neighboring carriers between two channels and statistically spreading the interference inside the cell.

At this point, groups of bits have been mapped into symbols representing locations in an amplitude and phase constellation. The STC encoder logic 418 will process the incoming symbols and provide n outputs corresponding to the number of transmit antennas 210 for the base station 104. The control system 202 and/or baseband processor 204 will provide a mapping control signal to control STC encoding. At this point, assume the symbols for the n outputs are representative of the data to be transmitted and capable of being recovered by the subscriber station 108.

For the present example, assume the base station 104 has two antennas 210 (n=2) and the STC encoder logic 418 provides two output streams of symbols. Accordingly, each of the symbol streams output by the STC encoder logic 418 is sent to a corresponding IFFT processor 420, illustrated separately for ease of understanding. Those skilled in the art will recognize that one or more processors may be used to provide such digital signal processing alone or in combination with other processing described herein. The IFFT processors 420 will preferably operate on the respective symbols using IDFT or like processing to effect an inverse Fourier Transform. The output of the IFFT processors 420 provides symbols in the time domain.

It should be apparent to a person skilled in the art that the STC encoder may be a space time transmit diversity (STTD) encoder or a spatial multiplexing (SM) encoder employing, for example, Bell Labs Layered Space-Time (BLAST).

The time domain symbols are grouped into frames, which are associated with prefix and pilot headers by like insertion logic 422. Each of the resultant signals is up-converted in the digital domain to an intermediate frequency and converted to an analog signal via the corresponding digital up-conversion (DUC) and digital-to-analog (D/A) conversion circuitry 424. The resultant (analog) signals are then simultaneously modulated at the desired RF frequency, amplified, and transmitted via the RF circuitry 426 and antennas 210. Notably, the transmitted data is preceded by pilot signals, which are known by the intended subscriber station 108 and implemented by modulating the pilot header and scattered pilot subcarriers. The subscriber station 108, which is discussed in detail below, will use the scattered pilot signals for channel estimation and interference suppression and the header for identification of the base station 104.

Figure 5:
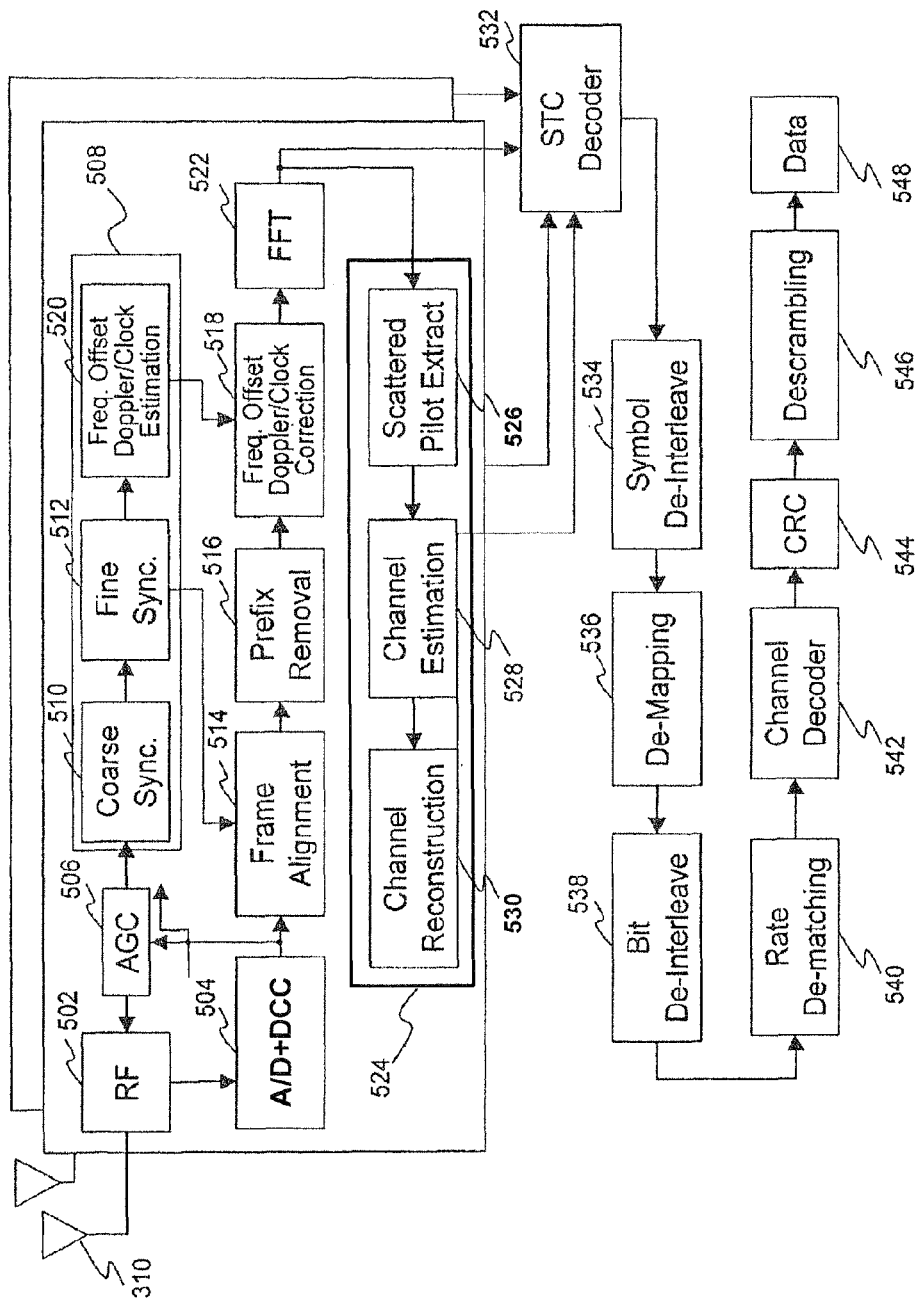
FIG. 5 is a logical breakdown of an OFDMA receiver architecture according to one embodiment of the present invention.

Reference is now made to FIG. 5 to illustrate reception of the transmitted signals by a subscriber station 108. Upon arrival of the transmitted signals at each of the antennas 310 of the subscriber station 108, the respective signals are demodulated and amplified by corresponding RF circuitry 502. For the sake of conciseness and clarity, only one of the two receive paths is described and illustrated in detail. Analog-to-digital (A/D) converter and down-conversion circuitry 504 digitizes and downconverts the analog signal for digital processing. The resultant digitized signal may be used by automatic gain control circuitry (AGC) 506 to control the gain of the amplifiers in the RF circuitry 502 based on the received signal level.

Preferably, each transmitted frame has a defined structure having two identical headers. Framing acquisition is based on the repetition of these identical headers. Initially, the digitized signal is provided to synchronization logic 508, which includes coarse synchronization logic 510, which buffers several OFDM symbols and calculates an autocorrelation between the two successive OFDM symbols. A resultant time index corresponding to the maximum of the correlation result determines a fine synchronization search window, which is used by the fine synchronization logic 512 to determine a precise framing starting position based on the headers. The output of the fine synchronization logic 512 facilitates frequency acquisition by the frequency alignment logic 514. Proper frequency alignment is important so that subsequent FFT processing provides an accurate conversion from the time to the frequency domain. The fine synchronization algorithm is based on the correlation between the received pilot signals carried by the headers and a local copy of the known pilot data. Once frequency alignment acquisition occurs, the prefix of the OFDM symbol is removed with prefix removal logic 516 and a resultant samples are sent to frequency offset and Doppler correction logic 518, which compensates for the system frequency offset caused by the unmatched local oscillators in the transmitter and the receiver and Doppler effects imposed on the transmitted signals. Preferably, the synchronization logic 508 includes frequency offset, Doppler, and clock estimation logic 520, which is based on the headers to help estimate such effects on the transmitted signal and provide those estimations to the correction logic 518 to properly process OFDM symbols.

At this point, the OFDM symbols in the time domain are ready for conversion to the frequency domain using the FFT processing logic 522. The results are frequency domain symbols, which are sent to processing logic 524. The processing logic 524 extracts the scattered pilot signal using scattered pilot extraction logic 526, determines a channel estimate based on the extracted pilot signal using channel estimation logic 528, and provides channel responses for all subcarriers using channel reconstruction logic 530. The frequency domain symbols and channel reconstruction information for each receive path are provided to an STC decoder 532, which provides STC decoding on both received paths to recover the transmitted symbols. The channel reconstruction information provides the STC decoder 532 sufficient information to process the respective frequency domain symbols to remove the effects of the transmission channel.

The recovered symbols are placed back in order using the symbol de-interleaver logic 534, which corresponds to the symbol interleaver logic 416 of the transmitter. The de-interleaved symbols are then demodulated or de-mapped to a corresponding bitstream using de-mapping logic 536. The bits are then de-interleaved using bit de-interleaver logic 538, which corresponds to the bit interleaver logic 412 of the transmitter architecture. The de-interleaved bits are then processed by rate de-matching logic 540 and presented to channel decoder logic 542 to recover the initially scrambled data and the CRC checksum. Accordingly, CRC logic 544 removes the CRC checksum, checks the scrambled data in traditional fashion, and provides it to the de-scrambling logic 546 for de-scrambling using the known base station de-scrambling code to recover the originally transmitted data.

Orthogonal frequency division multiplexing access (OFDMA) allows multiple users to transmit simultaneously on the different subcarriers per OFDM symbol. In an OFDMA/TDMA embodiment, the OFDM symbols are allocated by TDMA method in the time domain, and the subcarriers within an OFDM symbols are divided by OFDMA method in frequency domain into subsets of subcarriers, each subset is termed a subchannel. The subcarriers forming one subchannel may, but need not be adjacent. These subchannels are the basic allocation unit. Each allocation of subchannel may be allocated for several OFDM symbols in such a way that the estimation of each subchannel is done in frequency and time. The subchannel may be spread over the entire bandwidth. This scheme achieves improved frequency diversity and channel usage without the need for frequency separation between subcarriers. The allocation of carriers to subchannel may be accomplished by special Reed-Solomon series, which enables the optimization and dispersion of interfering signals inside a cell and between adjacent cells. Therefore, in the OFDMA/TDMA embodiment, OFDM symbols are shared both in time and in frequency (by subchannel allocation) between different users. When the OFDMA is used in the uplink (UL), it allows users to operate with smaller power amplifiers, at expense of instantaneous data rate. On the other hand it allows allocating dynamically larger amounts of bandwidth to users capable of utilizing it in terms of the link budget. When applied to the downlink (DL), OFDMA allows transmitting to multiple users in parallel with designated data streams, and may improve the link budget of disadvantaged users by allocating to their subchannels a larger fraction of their downlink transmit power.

Unless defined otherwise, technical and scientific terms used herein have the same meaning as defined in IEEE 806.16-2004 and IEEE 806.16e (available at www.ieee802.org) which are incorporated by reference in their entireties.

Figure 6:
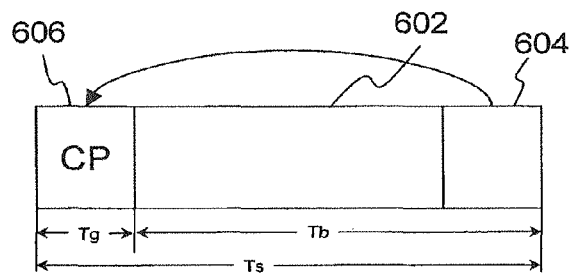
FIG. 6 (a) depicts an example of an OFDM symbol structure in time domain.
Figure 6:
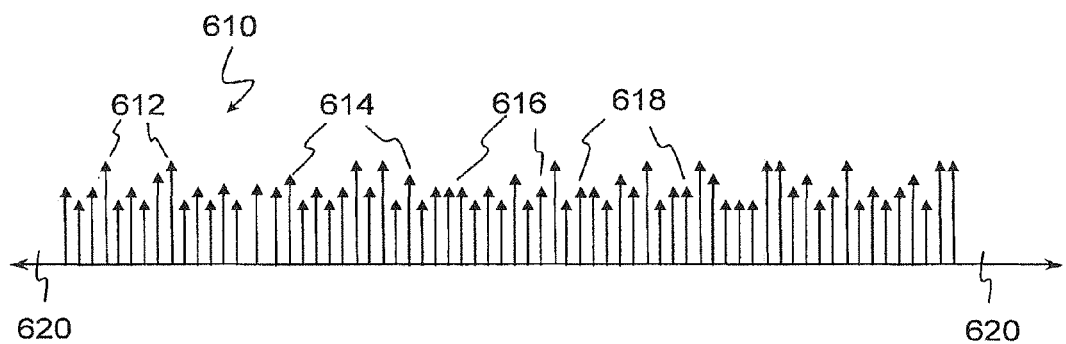

FIG. 6 shows the transmitted OFDM symbols arranged according to increasing time and increasing subcarrier frequency. The subcarrier frequencies contained within an OFDM symbol are each represented by circles. In the time domain, the first two symbols 602 of a frame may be preamble symbols 610, for example, in the case of a downlink (DL) subframe. Preamble symbols 612 may also be embedded in the frame, for example, in the case of an uplink (UL) subframe. Data symbols 606 for data transmission, or scattered pilot symbols for various estimation purposes 604 are transmitted, depending on the subcarrier frequency, until the next preamble symbols are transmitted. Null subcarriers 608 means no transmission, and may be used for guard bands, non-active subcarriers and the DC subcarrier. The preamble may provide one of the following fundamental operations: fast base station access, base station identification/selection and C/I ratio measurement, framing and timing synchronization, frequency and sampling clock offset estimation and initial channel estimation. The design of a frame preamble with minimized overhead is critical to maximum spectral efficiency and radio capacity.

FIG. 6a shows an example of an OFDMA symbol structure in time domain. OFDMA waveform is created by Inverse-Fourier-Transform. The time duration 602 is referred to as the useful symbol time $T_b$. A copy of a segment 704 (last $T_g$) of the useful symbol period 602, termed cyclic prefix (CP), is copied and appended to the beginning of the useful symbol time $T_b$ 606, and may be used to collect multipath, while maintaining the orthogonality of the tones. Using a cyclic extension, the samples required for performing the FFT at the receiver may have a small range of timing error, compared to the length of prefix, over the length of the extended symbol. This provides multipath immunity as well as a tolerance for symbol time synchronization errors.

An OFDMA symbol may be characterized by following primitive parameters: the nominal bandwidth (BW); the number of used subcarriers ($N_{used}$), for example, 1703; sampling factor n, which in conjunction with BW and $N_{used}$ determines the subcarrier spacing, and the useful symbol time, and the ratio of CP time $T_g$ to useful symbol time $T_b$ (G), for example, 1/4, 1/8, 1/16 or 1/32.

Based on the primitive parameters, other parameters could be derived: the FTT size $N_{FFT}$ which is the smallest power of two greater than $N_{used}$, for the above example of $N_{used}$=1703, $N_{FFT}$ is 2048; sampling frequency $F_s$=floor (n·8/7·BW/8000)×8000; Subcarrier spacing: $\Delta f = F_s/N_{FFT}$; useful symbol time: $T_b = 1/\Delta f$; CP Time: $T_g = G \cdot T_b$; OFDMA Symbol Time: $T_s = T_b + T_g$; and sampling time: $T_b/N_{FFT}$.

Referring to FIG. 6b, a basic structure of an OFDMA symbol 610 is described in frequency domain. As discussed in the above, an OFDMA symbol is made up of subcarriers 612-618, the number of which generally correlates to the FFT size used. There may be several subcarrier types: data subcarriers 612, 616, 618 are used for data transmission; pilot subcarriers 614 are used for various estimation purposes; and null carrier has no transmission at all, for guard bands 620 and DC carrier. Guard bands 620 are used to enable the signal to naturally decay and create the FFT "brick wall" shaping. In OFDMA, active subcarriers are divided into subsets of subcarriers, each subset is termed a subchannel. The symbol is divided into subchannels to support scalability, multiple access, and advanced antenna array processing capabilities. In FIG. 6 (b), three distinct subchannels 612, 616, and 618 are illustrated. Tens and hundreds of subchannels may be implemented. In the downlink, a subchannel may be intended for different (groups of) receivers; in the uplink, a transmitter may be assigned one or more subchannels, several transmitters may transmit simultaneously. The subcarriers forming one subchannel may, but need not be adjacent.

Figure 7:
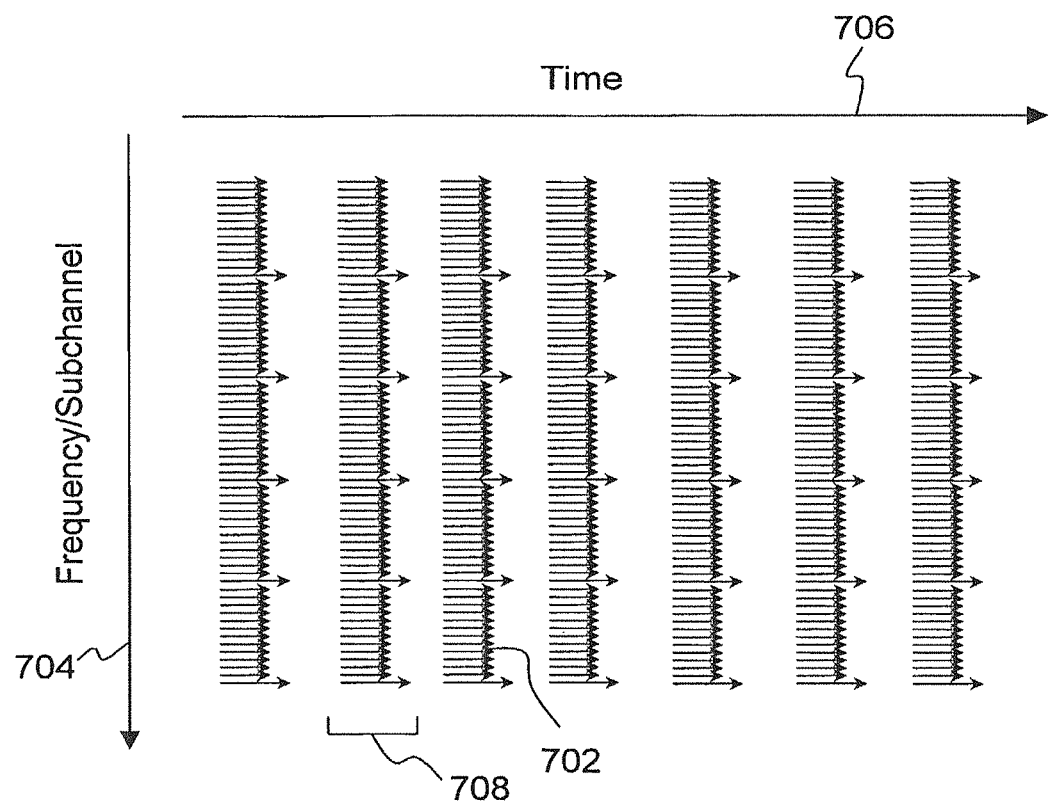
FIG. 7 shows an example of subchannel arranged in frequency domain.

In FIG. 7, each horizontal arrow 702 in the frequency domain 704 represents a logical subchannel. The symbol is divided into subchannels to support scalability, multiple access, and advanced antenna array processing capabilities. A minimum number of symbols are allocated to one subchannel, this may be accomplished by special Reed-Solomon series, which enable the optimization and dispersion of interfering signals inside a cell and between adjacent cells. Each subchannel is the basic allocation unit that a user can be allocated. In the time domain 706, OFDM symbols 708 are shown in columns as FIG. 7.

Figure 8:
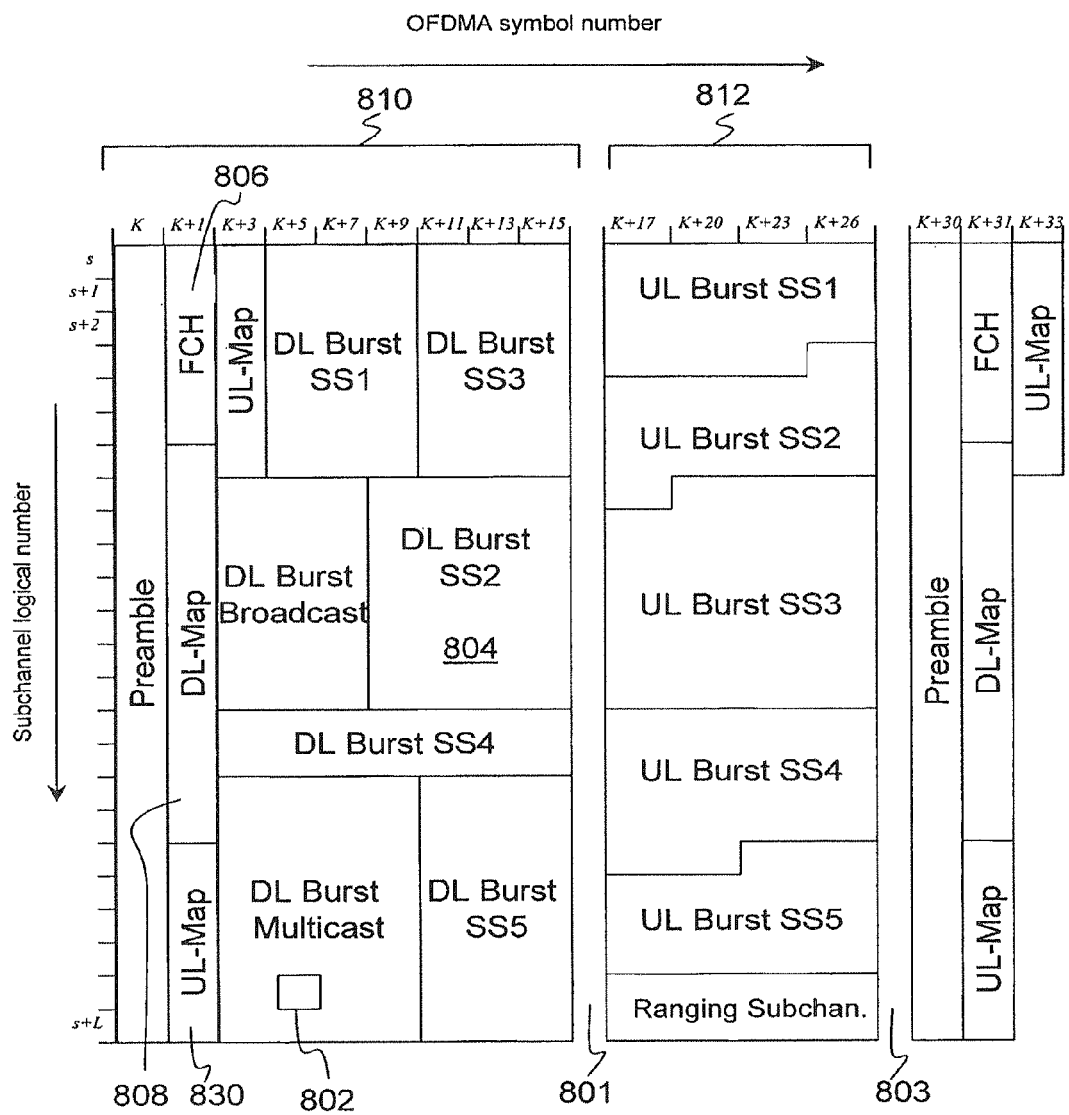
FIG. 8 shows a time plan for the OFDMA frame structure in time division duplex (TDD) mode.

When in a time plan such as the one illustrated in FIG. 8, a slot 802 is defined as a pair of an OFDM time symbol number and a subchannel logical number. A subchannel is the minimum possible data allocation unit, and its size may vary for uplink and downlink, for full used subchannelization (FUSC) and partially used subchannelization (PUSC), and for the distributed subcarrier permutations and the adjacent subcarrier permutation, between one subchannel by one OFDMA symbol to one subchannel by three OFDMA symbols. For example, in DL and UL PUSC which will be discussed below, the DL and UL subframe size and the granularity of the DL and UL allocations are one by two or one by three OFDM symbols, respectively. These slots may be referred to as clusters or tiles composing two and three OFDM symbols, respectively.

In OFDMA, a data region is a two-dimensional allocation of a group of contiguous subchannels, in a group of contiguous OFDMA symbols. Examples of data regions are shown in FIG. 8.

The DL-MAP message, if transmitted in the current frame, is the first MAC PDU in the burst following the FCH. An UL-MAP message follows immediately either the DL-MAP message (if one is transmitted) or the DLFP. If Uplink Channel Descriptor (UCD) and Downlink Channel Descriptor (DCD) messages are transmitted in the frame, they follow immediately the DL-MAP and UL-MAP messages. Simultaneous DL allocations can be broadcast, multicast, and unicast and they can also include an allocation for another base station rather than a serving base station. Simultaneous ULs can be data allocations and ranging or bandwidth requests.

There are two major subchannel allocation methods in the downlink: partial usage of subchannels (PUSC) where some of the subchannels are allocated to the transmitter, and full usage of the subchannels (FUSC) where all subchannels are allocated to the transmitter. In FUSC, there is one set of common pilot subcarriers, but in PUSC, each subchannel contains its own set of pilot subcarriers.

For FUSC in the downlink 810, the pilot tones are allocated first; then the zero carriers, then all the remaining subcarriers are used as data subcarriers, which are divided into subchannels that are used exclusively for data. There are two variable pilot-sets and two constant pilot-sets. In FUSC, each segment uses both sets of variable/constant pilot-sets.

Assuming an FTT size of 2048 is used, each subchannel in FUSC may comprise 48 subcarriers. The subchannel indices may be formulated using a Reed-Solomon series, and is allocated out of the data subcarriers domain. The data subcarriers domain includes 48*32=1536 subcarriers, which are the remaining subcarriers after removing from the subcarrier's domain (0-2047), the variable set and the constant set of pilots, guard subcarriers and the DC subcarrier.

The 1536 data subcarriers are partitioned into groups of contiguous subcarriers. Each subchannel consists of one subcarrier from each of these groups. The number of groups is therefore equal to the number of subcarriers per subchannel, $N_{subcarrier}$. The number of the subcarriers in a group is equal to the number of subchannels, $N_{subchannels}$. The partitioning of subcarriers into subchannels can be expressed in the following permutation formula.

$$\text{subcarrier}(k,s) = N_{subchannels} \cdot n_k + \{p_s[n_k \bmod N_{subchannels}] + \text{IDcell}\} \bmod N_{subchannels}$$

Wherein subcarrier (k,s) is the subcarrier index of subcarrier n in subchannel s, s is the index number of a subchannel, from the set $[0 \ldots N_{subchannels}-1]$, $n_k=(k+13 \cdot s) \bmod N_{subchannels}$, where k is the subcarrier-in-subchannel index from the set $[0 \ldots N_{subchannels}-1]$, $N_{subchannels}$ is the number of subchannels, $p_s[j]$ is the series obtained by rotating $\{PermutationBase_0\}$ cyclically to the left s times, ceil[ ] is the function that rounds its argument up to the next integer, IDcell is an integer ranging from 0 to 31, which identifies the particular base station segment and is specified by MAC layer, and $X_{mod(k)}$ is the remainder of the quotient X/k (which is at most k−1).

For PUSC in the downlink or in the uplink 810, the set of used subcarriers is first partitioned into subchannels, and then the pilot subcarriers are allocated from within each subchannel.

Figure 9:
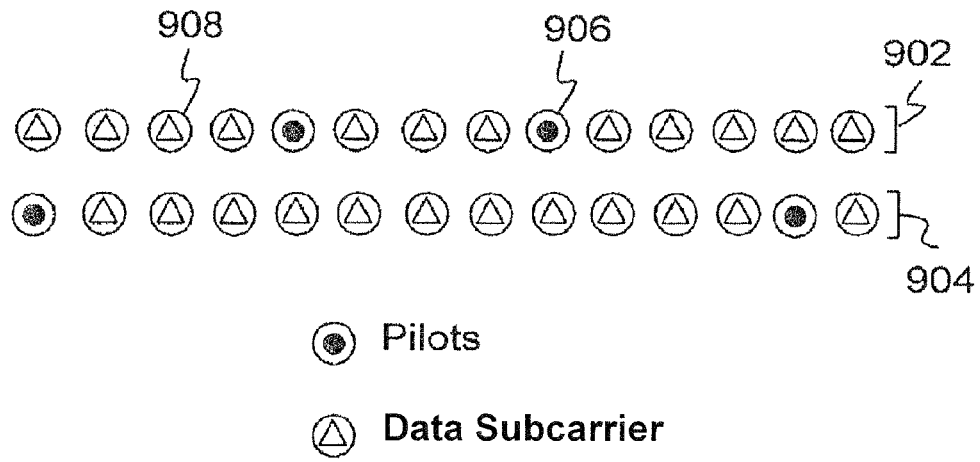
FIG. 9 (a) shows an example of a cluster.
Figure 9:
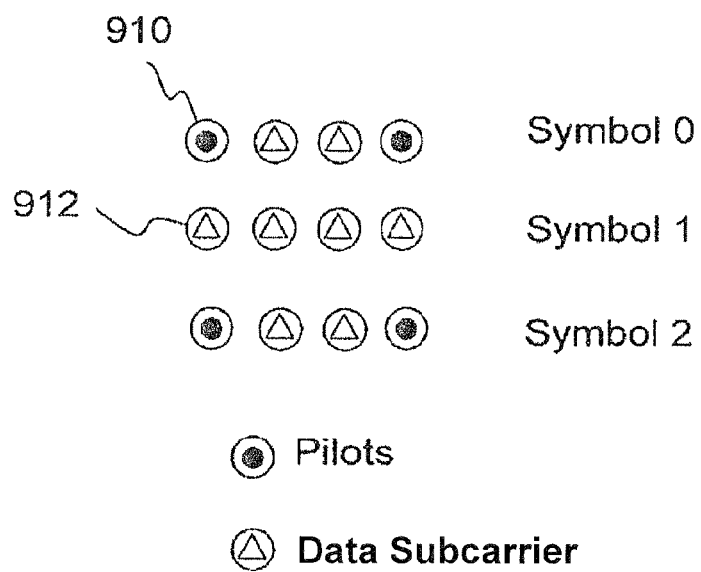

In a downlink using PUSC, a symbol is first divided into basic clusters as illustrated in FIG. 9 (a). Pilots 906 and data carriers 908 are allocated within each cluster 902 904. For an OADM symbol of FFT size 2048, the number of used subcarriers, after subtracting the guard subcarriers (367), is 1681. Each cluster may have 14 subcarriers for a total of 120 clusters. For the 60 subchannels the allocation of subcarriers is as following:

1) Dividing the subcarriers into 120 physical clusters containing 14 adjunct subcarriers each (starting from carrier 0).

2) Renumbering the physical clusters into logical clusters using the following formula (As illustrated in FIG. 8, the first PUSC zone of the downlink, the default IDcell is 0):

$$\text{LogicalCluster} = \text{RenumberingSequence}((\text{PhysicalCluster} + 13 * \text{IDcell}) \bmod 120)$$

3) Dividing the clusters into six major groups.

4) Allocating carriers to subchannel in each major group is performed by first allocating the pilot carriers within each cluster, and then taking all remaining data carriers within the symbol and using the same procedure as described above.

Referring to FIG. 8, an uplink 812 using PUSC, following a downlink 810 may also support up to three segments. For an OFDM symbol with FFT size 2048, a burst in the uplink may be composed of three time symbols and one subchannel, the three time symbols and one subchannel is termed a tile. Within each burst, there are 48 data subcarriers and 24 fixed-location pilot subcarrier, a total of 70 subchannels may be supported. The subchannel is constructed from six uplink tiles, each tile has four subcarriers per symbol. FIG. 9 (*b*) shows the structure of a tile with data subcarrier 912 and pilot subcarrier 910.

The permutation PUSC in UL is based on the allocation of tiles to subchannels through following steps:

1) Divide the 420 tiles into six groups, containing 70 adjacent tiles each.

2. Choose six tiles per subchannel based on $$\text{Tile}(s,n) = 70 \cdot n + (Pt[(s+n) \bmod 70] + UL\_IDcell) \bmod 70$$

wherein n is the tile index 0 . . . 5, Pt is the tile permutation, s is the subchannel number, UL_IDcell is an integer value in the range 0 . . . 69, which is set by the MAC layer.

After allocating the tiles for each subchannel the data subcarriers per subchannel are allocated as follows:

1) After allocating the pilot carriers within each tile, indexing the data subcarriers within the subchannels is performed starting from the first symbol at the lowest subcarrier from the lowest tile and continuing in an ascending manner throughout the subcarriers in the same symbol, then going to next symbol at the lowest data subcarrier, and so on. Data subcarriers shall be indexed from 0 to 47.

2) The allocation of the subcarriers is as follows:

$$\text{subcarrier}(n,s) = (n + 13 \cdot s) \bmod N_{subcarriers}$$

wherein n is a running index 0 . . . 47, s is the subchannel number, $N_{subcarriers}$ is the number of subcarriers per subchannel.

There are two main types of subcarrier permutations: distributed and adjacent. In general, distributed subcarrier permutations perform well in mobile applications while adjacent subcarrier permutations can be properly used for fixed, portable, or low mobility environments.

OFDMA DL and UL subframes start in DL and UL PUSC mode, respectively. In DL PUSC, subchannels may be divided and assigned to three segments that can be allocated to sectors of the same cell. A sector of a cell may be portioned through means known to a person skilled in the art, for example, through directional beam.

The available OFDMA subchannels may be divided into subset for deploying a single instance of the MAC, the subset is called a segment. A segment may include all available subchannels. In PUSC, for example, any segment has at least 12 subchannels. Therefore, a downlink may be divided into a three segments and a preamble structure which begins the transmission. The preamble subcarriers at the beginning of downlink may be also divided into three carrier-sets, each of them may be used by one of the segments in the following manner: segment 0 uses preamble carrier-set 0; segment 1 uses preamble carrier-set 1; and segment 2 uses preamble carrier-set 2.

Figure 10:
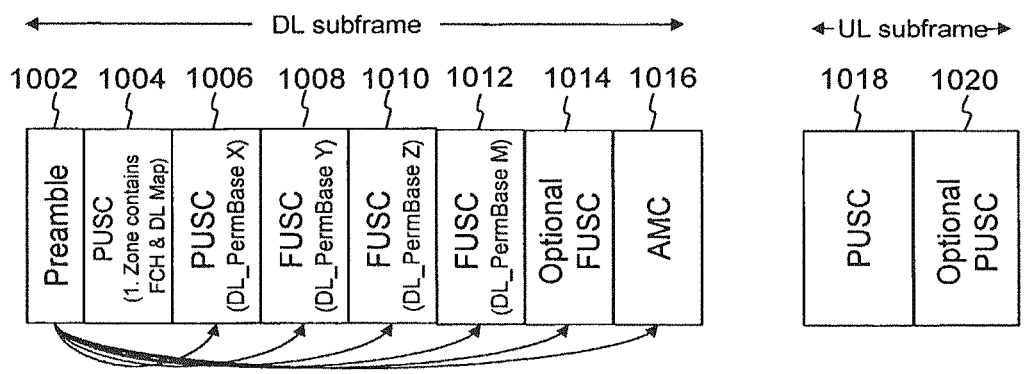
FIG. 10 (a) illustrates an OFDMA frame with multiple zones.
Figure 10:
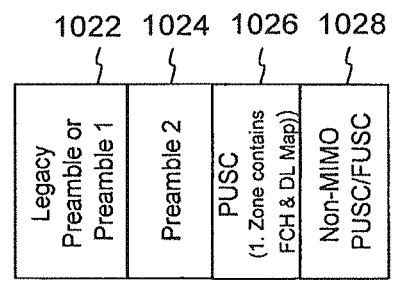
Figure 10:
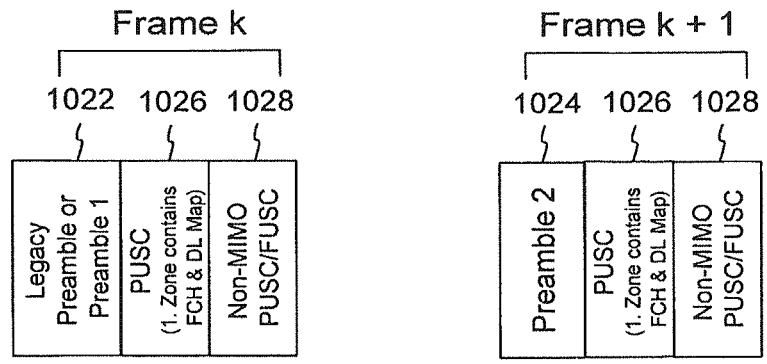
Figure 10:
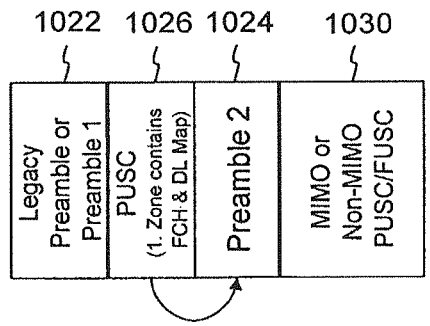
Figure 10:
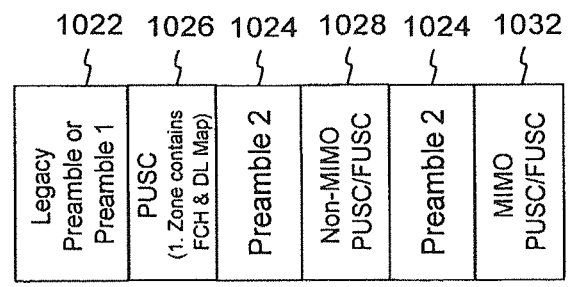

Permutation zone is a number of contiguous OFDMA symbols, in the DL or the UL, that use the same permutation formula. The DL subframe or the UL subframe may contain more than one permutation zone. An OFDMA frame may include multiple zones as illustrated in FIG. 10. Although the zones in FIG. 10 are shown as vertical columns spanning all the subchannel logical numbers, it should be apparent to a person skilled in the art that a permutation zone may also have other irregular shapes on a TDD time plan such as the one illustrated in FIG. 8.

FIG. 10 (*a*) illustrates zone switching within the DL and UL subframes. The switching is performed using an information element included in DL-MAP and UL-MAP. DL and UL subframes both start in PUSC mode where groups of subchannels are assigned to different segments by the use of dedicated FCH messages. The PUSC subcarrier allocation zone 1004 can be switched to a different type of subcarrier allocation zone through a directive from the PUSC DL-MAP 1004. FIG. 10 (*a*) shows the zone switching from the perspective of a PUSC segment. In FIG. 10 (*a*), the first zone PUSC contains FCH and DL-MAP 1004 is followed with another possibly data PUSC zone with a parameter "DL_PermBase X" 1006. A FUSC zone for another sector/cell with "DL_PermBase Y" 1008 is allocated next, followed by an FUSC zone for "DL_PermBase Z" 1010. A switching to FUSC "DL_PermBase M" 1012 can then be planned. Optional PUSC, FUSC 922, and AMC 924 zones in DL subframes and optional PUSC 1020 and AMC zones in UL subframes can be similarly scheduled. Allocation of AMC zones support simultaneously fixed, portable, and nomadic mobility users along with high mobility users.

The timing synchronization, namely the process whereby the starting and ending points of the transmitted data are determined, is usually carried out in two stages in an OFDM system.

In case each transmitted frame has a defined structure having two identical headers, framing acquisition is based on the identification of these identical headers. During the first coarse synchronization stage, several OFDM symbols are buffered and an auto-correlation between the two successive OFDM symbols is calculated. A resultant time index corresponding to the maximum of the correlation result may declare the first stage completed.

The fine synchronization process uses one or more preambles stored in a memory, and matches the stored preamble(s) to the transmitted preamble(s). From the starting point determined by the coarse synchronization and traversing forward and/or backward along the data stream, the encountered preambles are compared to the stored preamble by computing a correlation until a complete match is found.

Pseudo noise (PN) pilots in the preamble are typically used to conduct fine synchronization, in either the time domain or in the frequency domain. For MIMO, the final synchronization position is determined based on the correlation results from all MIMO channels.

Prior art preamble in OFDMA in MIMO systems is transmitted from a single antenna, and has no common synchronization channel. The other antennas simply transmit pilots. The pilots for channel estimation for these other antennas are more sparse and thus not adequate. This is especially true in fast fading channels. In slow fading channels, it is possible to combine these pilots which are spread across multiple symbols to form a single channel estimate. However, in fast fading channels (i.e. in high Doppler situations), one may not be able to combine the pilots spread across multiple symbols to form a channel estimate since the channel changes significantly during these symbols. The pilots are more sparse when the number of antennas is 3 or 4. It is then important to have a good channel estimate.

More generally, due to the increase of channel bandwidth in broadband wireless access, along with the increase of FTT size, preamble search requires excessively high computational.

In accordance with one embodiment of the present invention, there is provided a new set of preambles, which may be used for coarse timing and frame synchronization; IDcell identification; indication of the segment id; frequency synchronization; MIMO channel estimation; FUSC CIR measurement and PUSC CIR measurement. The new set of preambles may further support frequency domain fine frequency synchronization.

The new set of preamble functions as a training sequence for a subscriber station to gain access to a base station, or to a plurality of base stations. Each member of the new set of preambles may coexist with the existing legacy preamble, or replace the legacy preamble. The term "legacy preamble" is intended to include the prior art preamble in OFDMA frame, for example, described in IEEE802.16-2004.

One preamble of the new set is defined as a common preamble. The common preamble uses a common pseudo noise (PN) sequence for all base stations. The term common sequence is intended to indicate the common PN sequence used to modulate common channel subcarriers. The common channel subcarriers 1204, 1206, 1212 may carry PN code, e.g. $PN_c(1), PNe_c(2) \ldots PN_c(n)$. The subscriber station performs fine synchronization using the common PN sequence on the common preamble, and the resulting peaks will provide the locations of candidate base stations. The base station specific search is then performed in the vicinities of those peaks by using base station specific PN sequences. With this two stage cell search, the searching window is drastically reduced.

For the synchronized base station deployment, if the anchor base station broadcasts the neighbor base station list for M sectors, the number of the cell specific sequences applied in cell search may be reduced. The correlation of the common preamble allows the base station specific preamble search window to reduce, for example to about 5 samples or less, the common preamble assisted cell specific preamble searching can speed up the preamble search time by 60 times, or to reduce the search computational complexity by 60 times. The term "Preamble-1" is intended to describe the common preamble in the following description.

Another member of the new set is defined as a cell-specific preamble, comprising cell-specific synchronization subcarriers, it may be used in MIMO or non-MIMO systems. The cell-specific preamble may be termed as "Preamble-2" in the following description.

The allocation and the structure of the two preambles in the new preamble set, Preamble-1 and Preamble-2, which act as a training sequence for the subscriber in facilitating the access to the base stations, will now be described.

FIG. 10 (*b*) illustrates a first embodiment of the present invention wherein two preambles, Preamble-1, or a legacy preamble, 1022 and Preamble-2 1024 are located in the consecutive OFDMA ZONES, before the FCH and DL_MAP 1026 and a non-MIMO zone 1028. As will be discussed later, in accordance with one embodiment of the present invention, Preamble-1 may be responsible for coarse synchronization, finding the candidate fine synchronization positions, indicating the configuration of Preamble-2, and indicating the segment id; while Preamble-2 may be responsible for IDcell identification; fine synchronization; MIMO channel estimation; FUSC CIR measurement. PUSC CIR measurement may be extracted from DL_MAP by decision feedback.

FIG. 10 (*c*) illustrates a second embodiment of the present invention where the Preamble-1, (or legacy preamble) 1022 and Preamble-2 1024 are inserted every L frames. If the L is equal to 1, Preamble-1 (or legacy preamble) and Preamble-2 are inserted into alternating frames.

FIG. 10 (*d*) illustrates a third embodiment of the present invention where the Preamble-2 1024 is inserted after DL_MAP symbols and before either MIMO zone or non-MIMO zone.

If a non-MIMO permutation zone and a MIMO zone are used in the same frame, the fourth embodiment of the present invention is shown in FIG. 10 (*e*). Here, two Preambles-2 1024 are inserted before a non-MIMO permutation zone 1028 and a MIMO permutation zone 1030, respectively.

Figure 11:
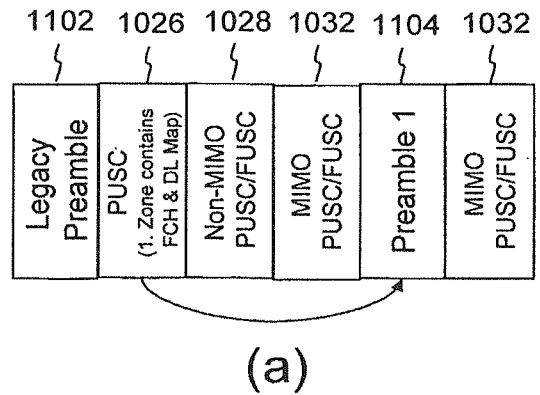
FIG. 11 (a) shows an embodiment of Preamble-1 in an OFDMA frame, in coexistence with legacy preamble.
Figure 11:
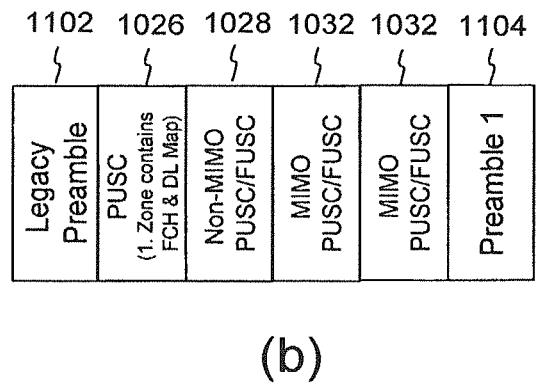
Figure 11:
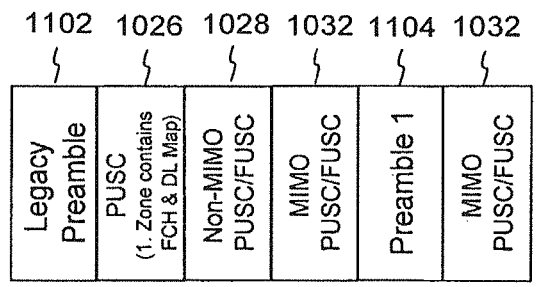

Referring to FIG. 11 (*a*), Preamble-1 1104 is at a location indicated by an information element, for example, the DL_Common_SYNC_Symbol_IE in the DL_MAP_IE. Frame L has legacy preamble 1102, non-MIMO permutation zone 1028 and MIMO permutation zone 1032. Preamble-1 may also be indicated in downlink channel descriptor (DCD) by the TLV values of common synch preamble transmission cycle, offset, and symbol offset. Preambles may also be inserted at the end of the frame as illustrated in FIG. 11 (*b*), or at other predetermined locations, as illustrated in FIG. 11 (*c*), and co-exists with legacy preamble. The predetermined location as exemplified in FIG. 11 (*c*) does not require an indication, for example, in an information element.

Figure 12:
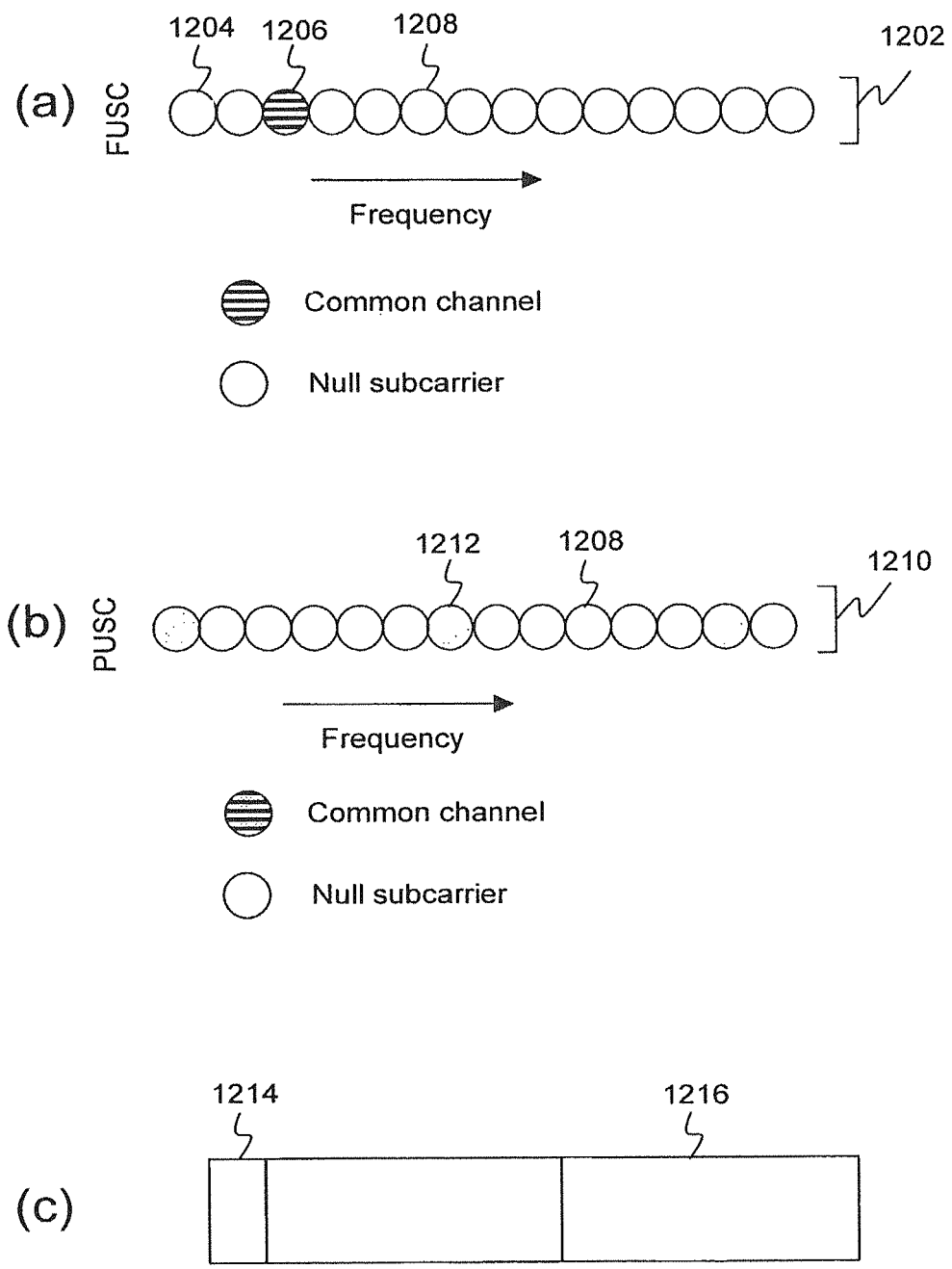
FIG. 12 (a) shows an example of the structure of Preamble-1 in FUSC mode in frequency domain.

Now turning to the structures of the preambles of the present invention, FIG. 12 illustrates an embodiment of a frequency domain Preamble-1 structure 1202 applied by all sectors. For FUSC, as shown in FIG. 12 (*a*), Preamble-1 1202 has common synchronization channel consists of common synchronization subcarriers 1204, 1206 as every 2nd subcarrier, the null-subcarriers 1208 are considered as non-transmitting by all sectors. The common PN sequence may have a low Peak to Average Power Ratio (PAPR). FIG. 12 (*b*) is an example of the frequency domain Preamble-1 structure 1210 for PUSC where every 6th subcarrier is a common channel subcarrier 1212. FIG. 12 (*c*) shows an example of an OFDM symbol in FUSC, in time domain after invert Fourier transform of the frequency structure described in FIG. 12 (*a*), with a prefix 1214 and two repeated sequences 1216. The term common synchronization channel is intended to indicate the sequential order of the common channel subcarriers being transmitted by the base stations to facilitate the coarse synchronization. The common channel subcarriers 1204, 1206, 1212 may carry common PN code, e.g. $PN_c(1), PN_c(2) \ldots PN_c(n)$.

The repeated time domain structure of Preamble-1 may be used to support frame synchronization, coarse timing and frequency synchronization by using auto-correlation peak to identify coarse frame boundary; to provide the candidate fine synchronization positions for cell identification by using the cross correlation peak to identify frame location and to support FFT size identification by using auto-correlation with different window size (equal to FFT size) to identify the FFT size, and by auto-correlation to estimate frequency offset.

As indicated in Table 1, the number of the OFDM symbols varies for different bandwidth with different FFT sizes to maintain the same synchronization performance. For example, while in FUSC mode, for FFT size of 256, the length of the common sequence is 64 while for FFT size of 2048, the length of the common sequence is 1024. Accordingly, the number of OFDM symbols is 8 for FFT size 128 and 0.5 for FFT size 2048.

TABLE 1

| FFT | 128 | 256 | 512 | 1024 | 2048 |
|---|---|---|---|---|---|
| Sequence length (FUSC) | 64 | 128 | 256 | 512 | 1024 |
| Sequence length (PUSC) | ~21 | ~42 | ~85 | ~170 | ~341 |
| # OFDM symbol for Preamble-1 | 8 | 4 | 2 | 1 | 0.5 |

This advantageous same synchronization performance for different channel bandwidth is maintained through the scalability of the sequence length. However, it is also possible to use same number of OFDM symbols, or different sequence length in different channel bandwidths, at corresponding varying synchronization performance.

Figure 13:
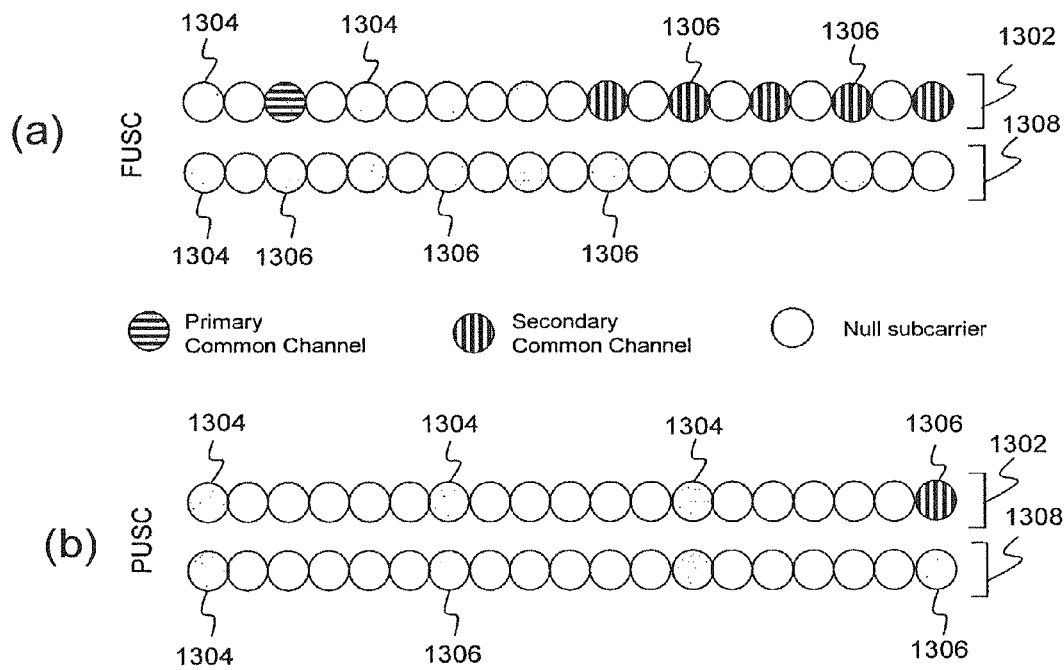
FIG. 13 (a) shows an example of a primary common synchronization channel and a secondary common synchronization channel in FUSC mode.

In another embodiment of the present invention, a plurality of common sequences may be implemented in Preamble-1 to carry other signaling information, for example, the number of antennas used in the Preamble-2, or the operation mode of the Preamble-2: PUSC or FUSC. FIG. 13 illustrates an example of two groups of subcarriers assigned to carry the primary common channel 1302 and the secondary common channel 1308. Referring to FIG. 13 (a) where Preamble-1 in FUSC mode is shown, the first group is mapped onto primary common channel 1304, the second group is mapped onto secondary common channel 1310. As illustrated, the primary common channel may use the same sequence 1302 for all sectors, while the secondary common channel may carry multiple sequences 1308, each sequence index is used for carrying signaling information. For example, 8 sequences may be used to carry 3 bits signaling information: bit 0 to indicate the operation mode Preamble-2, bit 1-2 to indicate the number of antennas. Another example for PUSC mode is shown in FIG. 13 (b), where the primary common channel subcarriers 1304 and secondary common channel subcarriers 1306 are present at every 6 subcarriers.

Preamble-1 may also be located at a pre-determined location, for example, at the end of the frame, illustrated in FIG. 11 (b), or with a flexible location in the frame and indicated by signaling, for example, in DL_MAP as shown in FIG. 11 (a).

Figure 14:
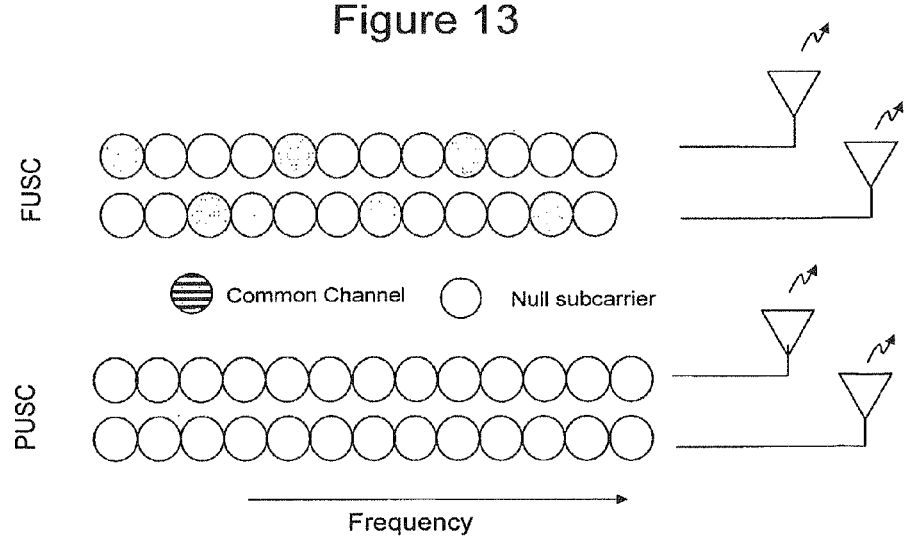
FIG. 14 shows an example of Preamble-1 mapped to two antennas is cyclic shift in frequency domain.
Figure 14:
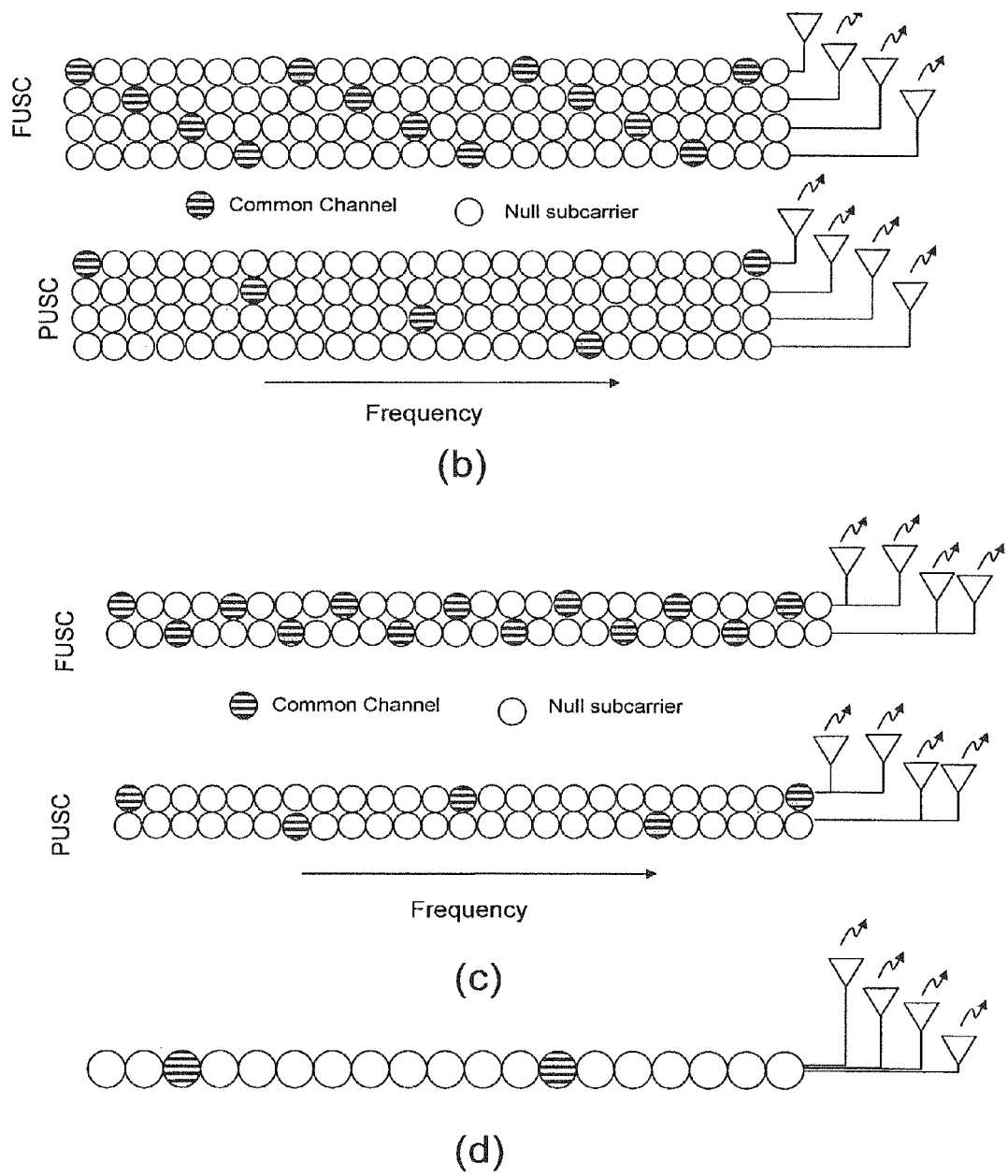

Preamble-1 and Preamble-2 may be used for different input output configurations. For single-input, single-output (SISO) Preamble-1 is transmitted by single antenna. Four transmission formats for multiple-input, single-output (MISO) or multiple input, multiple output (MIMO) may be used: transmission by single antenna; each antenna transmits the same construction of the Preamble-1; each antenna transmits the same construction of the Preamble-1 but cyclic shift in frequency domain is used; and as shown in FIG. 14 (a), same construction of the Preamble-1, but each of the two antennas is cyclic shift in frequency domain. Referring to FIG. 14 (b), Preamble-1 is transmitted on four separate MIMO antennas with cyclic shift in frequency domain. It should be apparent to a person skilled in the art that similar arrangements can be easily made for a three antennas or, in general, for N antennas arrangement where N>1. Preamble-1 may also be transmitted on, as shown in FIG. 14 (c) on three or four antennas in a combination of cyclic shift in frequency domain and RF combining. FIG. 14 (d) shows an example of Preamble-1 transmitted on four antennas, in a format of RF combining.

A second preamble, Preamble-2, may complement the functions of Preamble-1. Preamble-1 and Preamble-2 may be present in different frames as illustrated in FIG. 10 (c), or in the same frame as illustrated in FIGS. 10 (d) and (e).

Preamble-2 may be used for sector identification. This sector identification may have the following functionalities: cell identification and selection, fine synchronization, MIMO channel estimation and CIR estimation, which allows the estimation of power from other sector powers and the channel response. Furthermore, cell specific (IDcell) sequences with low PAPR may be mapped to antenna specific subcarriers set.

As illustrated in FIGS. 10 (d) and (e), Preamble-2 may also be located in a flexible location in the frame and indicated by signaling, for example, in DL_MAP.

Figure 15:
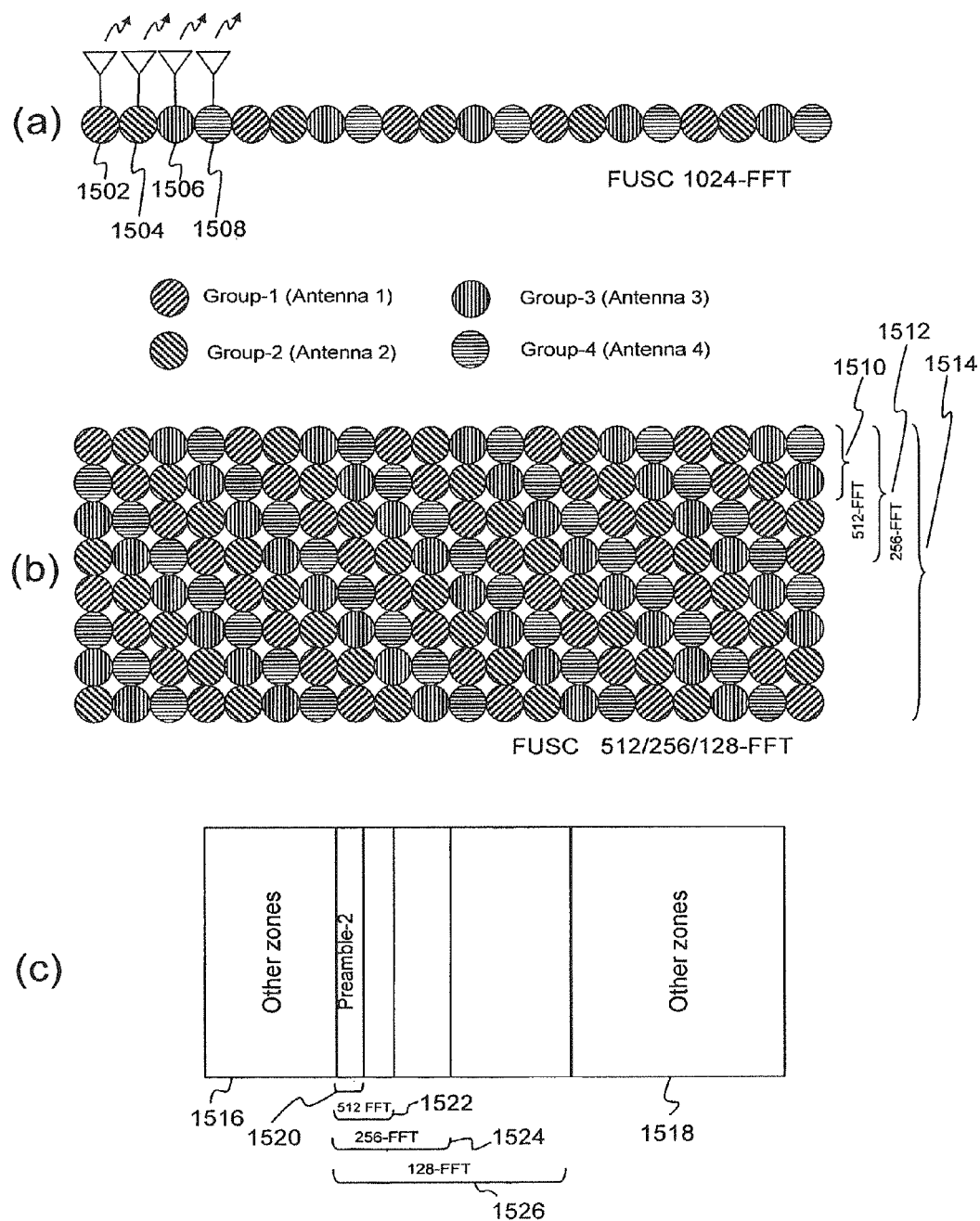
FIG. 15 (a) depicts an example of Preamble-2 structure for FFT size 1024 transmission in FUSC mode.

In MIMO transmission, the orthogonality of Preamble-2 is maintained. Referring to FIG. 15 (a) where an FFT size 1024 transmission in FUSC mode is illustrated, the subcarriers of Preamble-2 are partitioned into four groups 1502, 1504, 1506, and 1508, each antenna modulates the subcarrier in the corresponding group. In case there is only one transmit antenna group 1502, 1504, 1506, and 1508 are used by single antenna; for two transmit antennas case, groups 1502 and 1506 are used by one antenna and groups 1504 and 1508 are used by another antenna; for three transmit antennas case, groups 1502, 1504, and 1506 are used by different antennas and no-transmission for group 1208; and for four transmit antennas, all four groups 1502, 1504, 1506 and 1508 are used by different antennas.

Here, the advantage of Preamble-2 is demonstrated through the flexibility of the mapping of antennas. The number of the groups is defined, regardless of the number of antennas. The assignment of the antennas is decided based on the number of antennas used.

These antenna mapping schemes can also be applied to PUSC where only the subcarriers in the clusters of assigned segment are used by each sector.

As discussed above, to maintain the same synchronization performance for different bandwidth with different FFT sizes, the OFDM symbol numbers need to be scaled accordingly for corresponding lower FFT size transmissions. FIG. 15 (b) shows the scaled OFDM symbols for 512-FTT 1510, 256-FFT 1512 and 128-FFT 1514 of the corresponding 1024-FFT in FIG. 15 (a).

FIG. 15 (c) is an example of a time plan representation of the scalable synchronization performance of the Preamble-2. Preamble-2 is positioned between two zones 1516, and 1518. Referring to FIGS. 10 (b), (d) and (e), zone 1516 may be Preamble 1, DL_MAP or PUSC/FUSC; zone 1518 may be DL_MAP, MIMO or non-MIMO PUSC/FUSC. For FFT size 1024, Preamble-2 1520 has one unit size, for example, one OFDM symbol; for FFT size 512, Preamble-2 1522 has two-unit size; for FFT size 256; the size of Preamble-2 1524 doubles again; and Preamble-2 1526 for FFT size 128 is eight times of Preamble-2 for 1024-FFT.

Both training sequences, namely Preamble-1 or Preamble-2 may have different sequence for different bandwidths with corresponding different FFT sizes. Preamble-1 or Preamble-2 may also have a parent sequence for one particular bandwidth/FFT size, and obtain the other sequences for other bandwidths with corresponding FFT sizes through truncation or concatenation.

FIGS. 13, 14 and 15 illustrate Preamble-1 and Preamble-2 in both FUSC mode and PUSC mode. However, it should be apparent to a person skilled in the art that the examples described here can easily adapted to other usage modes for allocating the subcarriers. In fact, the flexibility of the subcarrier allocation is one of the advantages of the training sequences, Preamble-1 and Preamble-2, as described.

Figure 16:
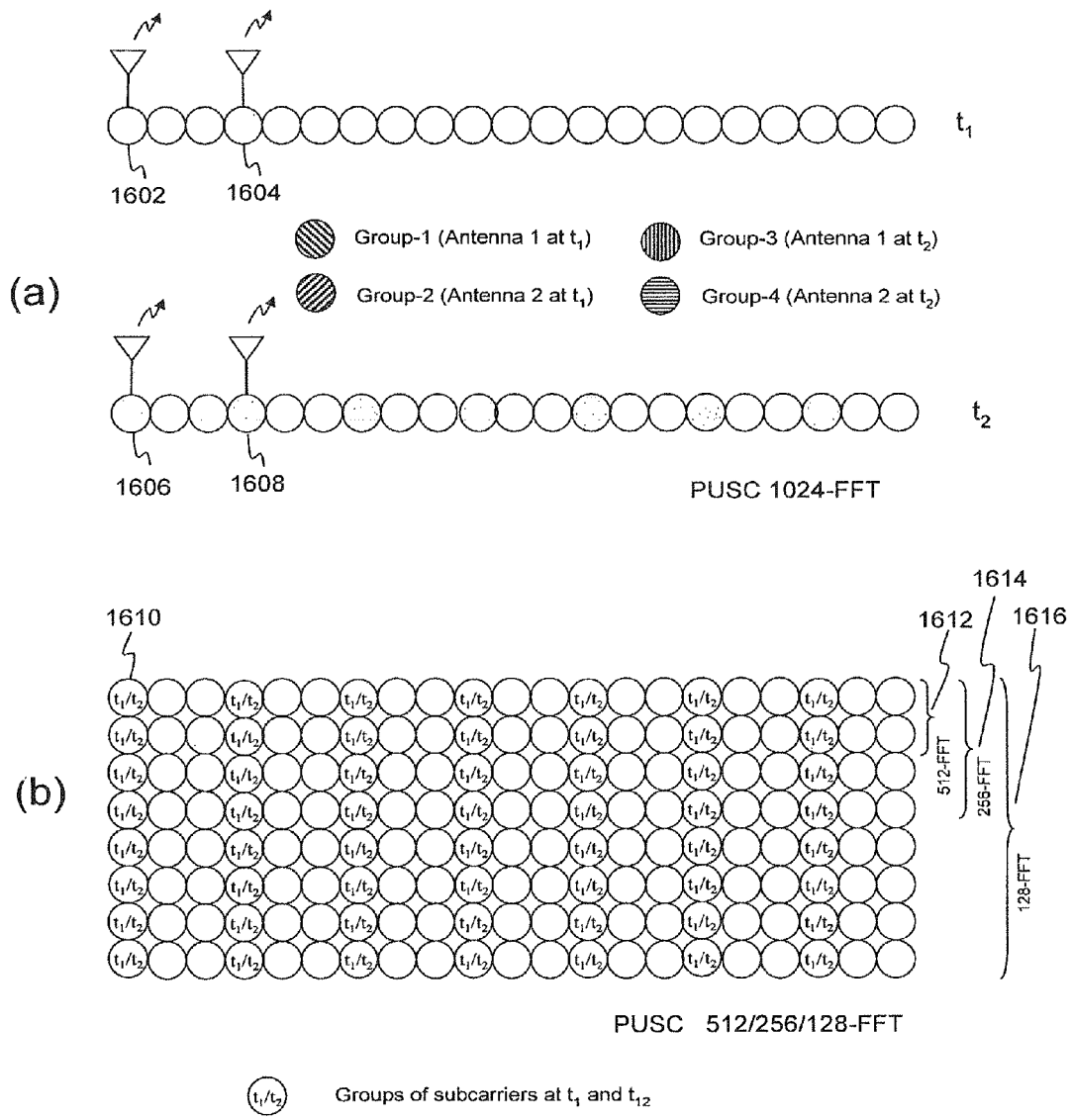
FIG. 16 (a) depicts an example of Preamble-2 structure for FFT size 1024 transmission in PUSC mode at different times $t_1$ and $t_2$.

FIG. 16 shows another example of Preamble-2 using time division for multiple antenna mapping. FIG. 16 (a) show the partition of the used subcarriers into two groups 1602, 1604 at different times $t_1$ and $t_2$, each antenna modulates the subcarrier in the corresponding group and time. For example, for one transmit antenna, group 1602 at time $t_1$ is transmitted; for two transmit antennas group 1602 and 1604 are sent at time $t_1$; for three transmit antennas transmission groups 1602, 1606 are active at $t_1$ and $t_2$, and group 1608 is active at $t_2$; and for the four transmit antennas case, all four groups 1602, 1604, 1606 and 1608 are transmitting at $t_1$ and $t_2$.

FIG. 16 (*b*) shows the scaled OFDM symbols 1610 for 512-FTT 1612, 256-FFT 1614 and 128-FFT 1616 of the corresponding 1024-FFT in FIG. 16 (*a*). The subcarrier 1610 represent subcarriers 1602, 1604, 1606 and 1608 at $t_1$ and $t_2$.

In practice, the power on the modulated tones may be boosted to reach maximum transmit power allowed.

Figure 17:
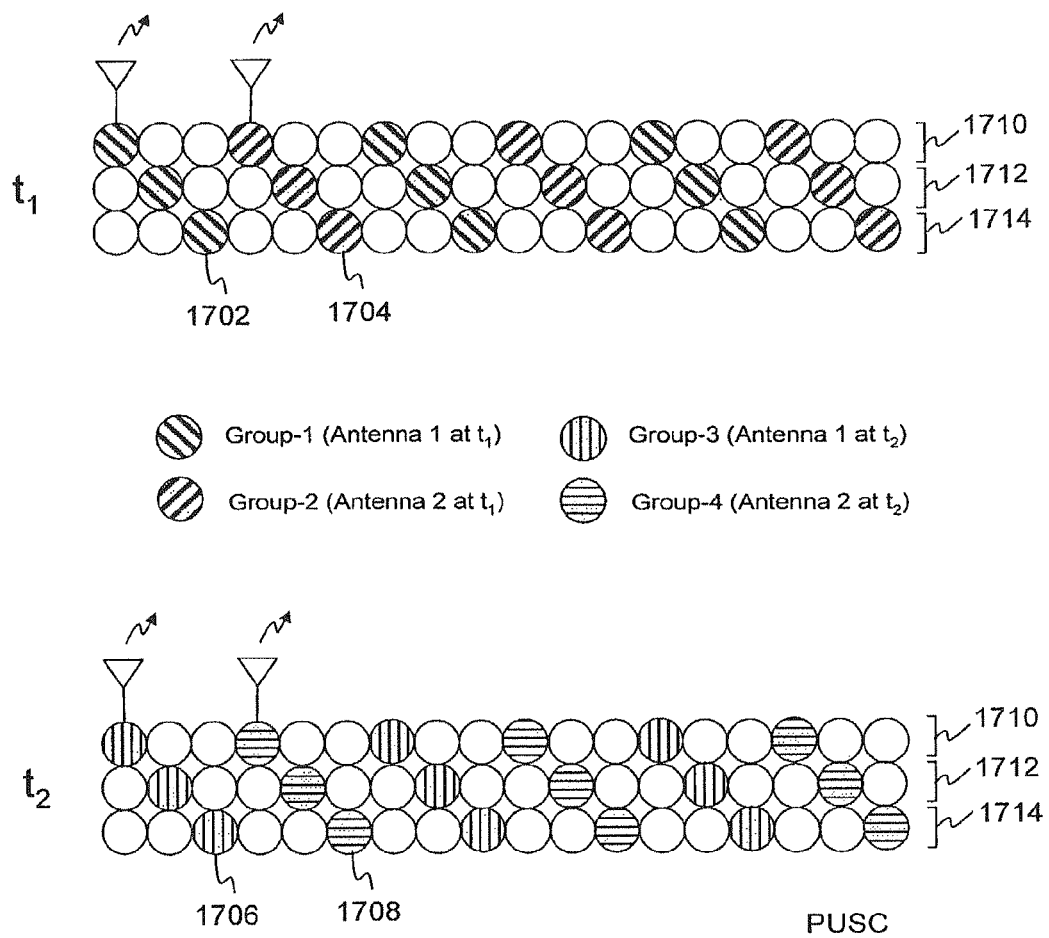
FIG. 17 shows another example of Preamble-2 using time diversity.

FIG. 17 is another example of Preamble-2 using time division for multiple antenna mapping. The used subcarriers are partitioned into 6 groups, each antenna in each segment modulates the subcarrier in the corresponding group and time. In PUSC, subcarriers may be divided and assigned to three segments that can be allocated to sectors of the same cell. At $t_1$, groups 1702 and 1704 are transmitted, and at $t_2$ groups 1706 and 1708 are transmitted, respectively, in each of the three segments 1710, 1712, and 1714.

Figure 18:
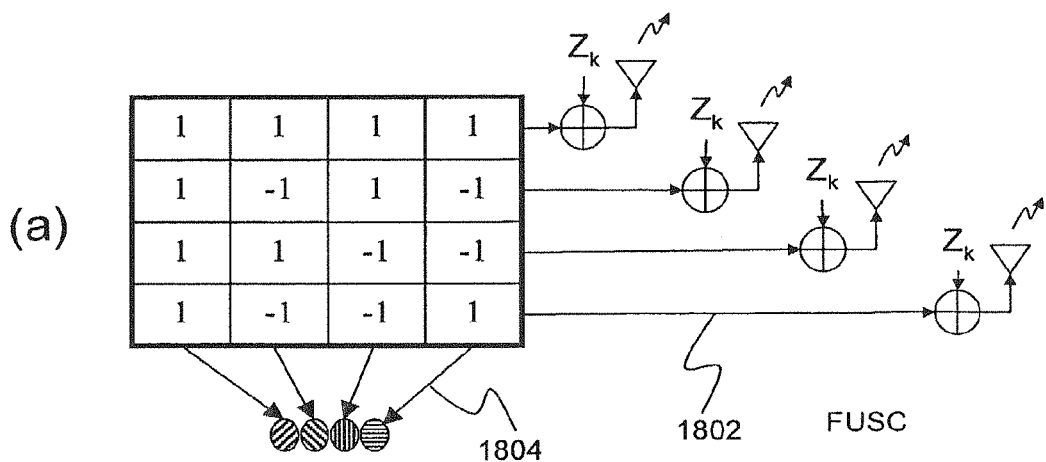
FIG. 18 (a) shows an example of Walsh code and antenna mapping in FUSC mode.
Figure 18:
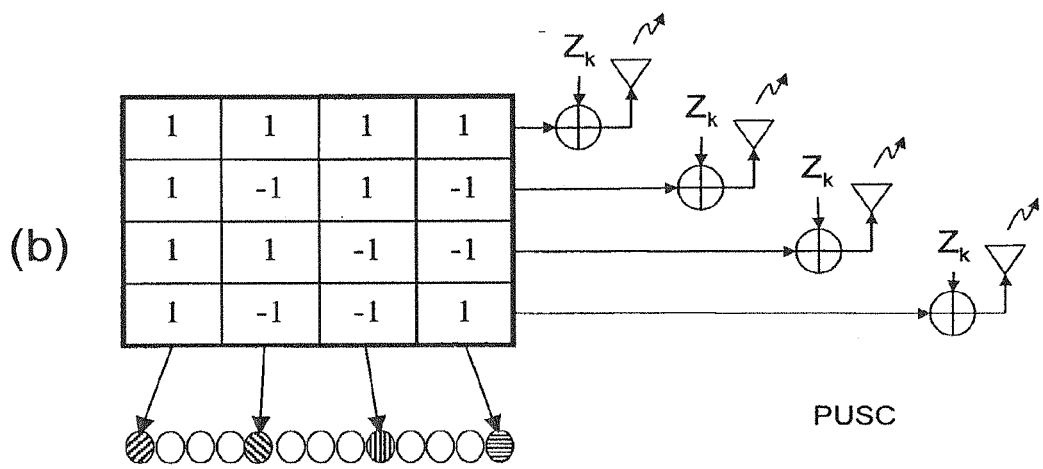
Figure 18:
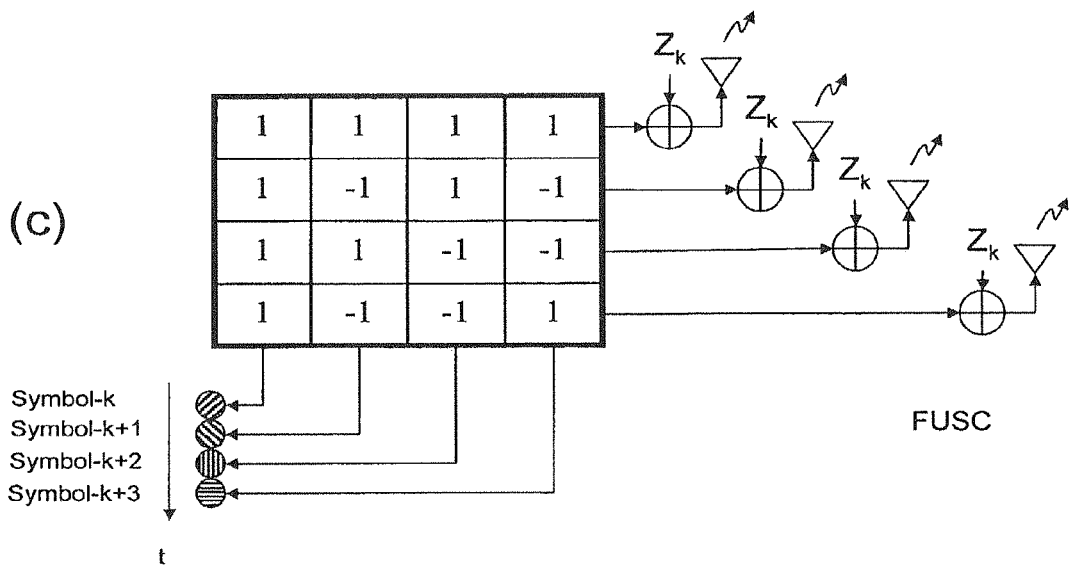
Figure 18:
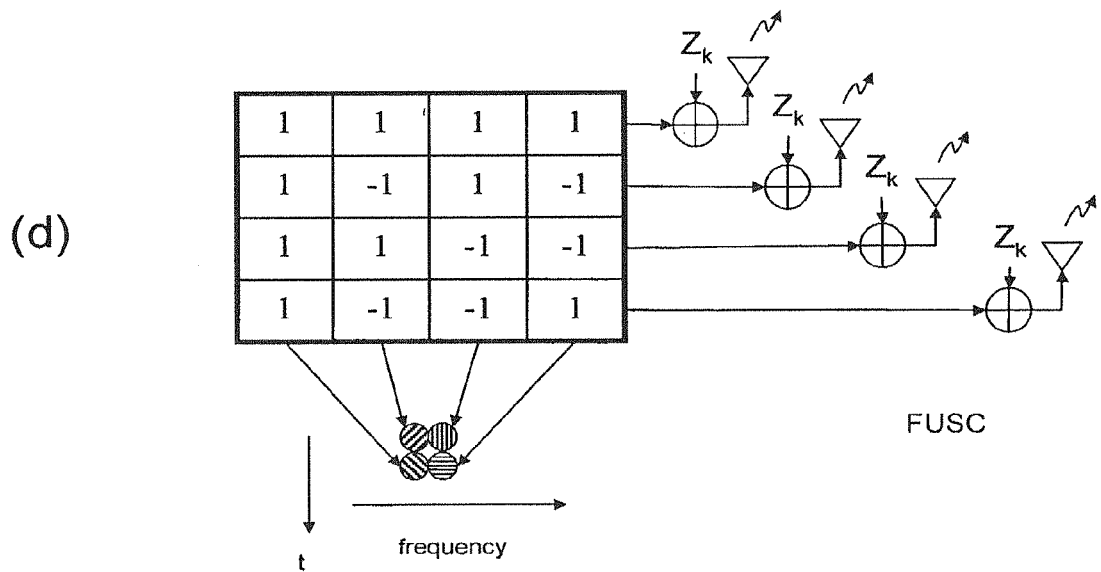

In another embodiment of the present invention, Preamble-2 may be implemented using code division for multiple antenna mapping. FIG. 18 shows the examples of using Walsh code for the subcarriers and mapped on the antennas. FIG. 18 (*a*) shows an example of Walsh code and antenna mapping in FUSC mode. In this example, Walsh code is mapped onto antennas 1802. The code used for antenna may be smaller than the code length, hence the code selection may be considered jointly with PAPR minimization. The Walsh chip is mapped onto subcarriers 1804. The code length span may be smaller than the coherent bandwidth. The Walsh code may be covered by another common Walsh sequence or a PN sequence to allow whitening of other sectors and minimization of cell interference. The code selection may be considered jointly with PAPR minimization. Each cell or sector may be allocated different Walsh/PN sequence for covering.

FIG. 18 (*b*) shows an example of Walsh code and antenna mapping in PUSC mode, similar to the mappings in FIG. 18 (*a*). FIG. 18 (*c*) shows an example of Walsh chip mapping onto subcarriers in time direction. FIG. 18 (*d*) shows an example of Walsh chip mapping onto subcarriers in both time and frequency domain.

Figure 19:
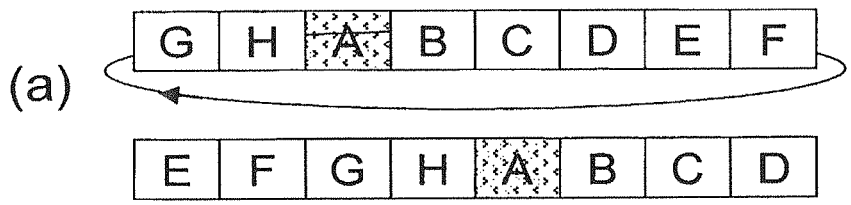
FIG. 19 (a) depicts an example of Steiner approach for cyclic shift in time for Preamble-2 in FUSC mode.
Figure 19:
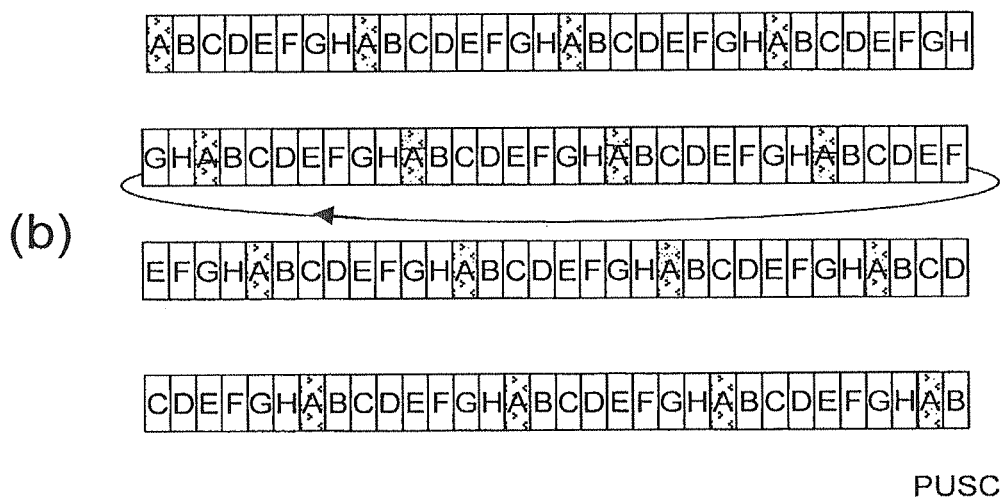

FIG. 19 shows examples where Steiner approach for cyclic shift in time domain is used to construct Preamble-2 for a low PAPR and low cross correlation sequence in FUSC mode (FIG. 19 (*a*)) and in PUSC mode (FIG. 19 (*b*)).

Figure 20:
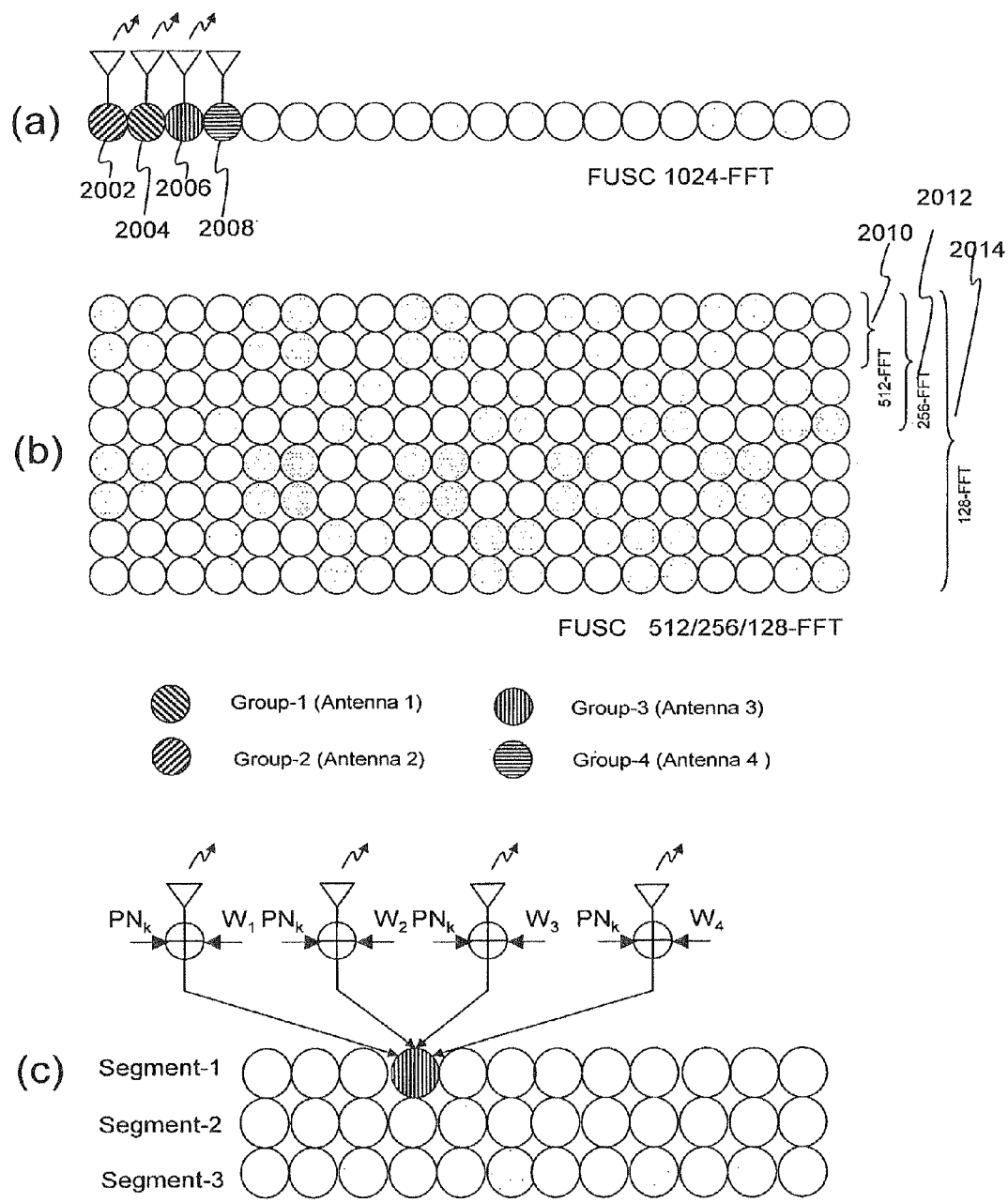
FIG. 20 (a) is an example of a hybrid FFT size 1024 transmission of Preamble-2 in FUSC mode.

FIG. 20(*a*) shows an embodiment of an FFT size 1024 hybrid transmission of Preamble-2 in FUSC mode is illustrated, the subcarriers of Preamble-2 are partitioned into four groups 2002-2008, each antenna modulates the subcarriers in the corresponding group. Auto-correlation based on the repetition structure time is used. The presence of the null carriers allows interference avoidance and CIR estimation, and also time domain repetition structure to support auto-correlation based coarse synchronization.

FIG. 20 (*b*) is a corresponding hybrid transmission of Preamble-2 in FUSC mode in FFT size 512 (2010); FFT size 256 (2012) and FFT size 128 (2014), respectively.

FIG. 20 (*c*) shows an example of relation between the antenna and segment mapping for PUSC.

Table 2 is a summary of the length of Preamble-2 sequence, the number of the OFDM symbols varies with different FFT sizes as well as with the number of antennas. For example, while in FUSC mode with two antennas, for FFT size of 256, the length of the common sequence is 64 while for FFT size of 2048, the length of the common sequence is 512.

| Antenna | FFT | 128 | 256 | 512 | 1024 | 2048 |
|---|---|---|---|---|---|---|
| 1 | FUSC | 64 | 128 | 256 | 512 | 1024 |
| 1 | PUSC | ~21 | ~42 | ~85 | ~170 | ~341 |
| 2 | FUSC | 32 | 64 | 128 | 256 | 512 |
| 2 | PUSC | ~10 | ~21 | ~32 | ~64 | ~128 |
| 3 | FUSC | ~10 | ~21 | ~32 | ~64 | ~128 |
| 3 | PUSC | ~3 | ~7 | ~10 | ~21 | ~32 |
| 4 | FUSC | 16 | 32 | 64 | 128 | 256 |
| 4 | PUSC | ~5 | ~10 | ~21 | ~32 | ~64 |

As discussed before, the scalability of the sequence length provides the advantage of same synchronization performance at different channel bandwidth. However, it is also possible to use same number of OFDM symbols or different sequence length in different channel bandwidths, at corresponding varying synchronization performance.

In accordance with embodiments of the present invention, Preamble-1 and Preamble-2 sequence may be real or complex sequence. One of the characteristics of the sequence is the lower cross correlation and PAPR value. The sequences may be generated using methods known to those skilled in the art, for example, computer searched PN sequence; Golay sequence; generalized linear chirp sequence or CAZAR sequence.

Figure 21:
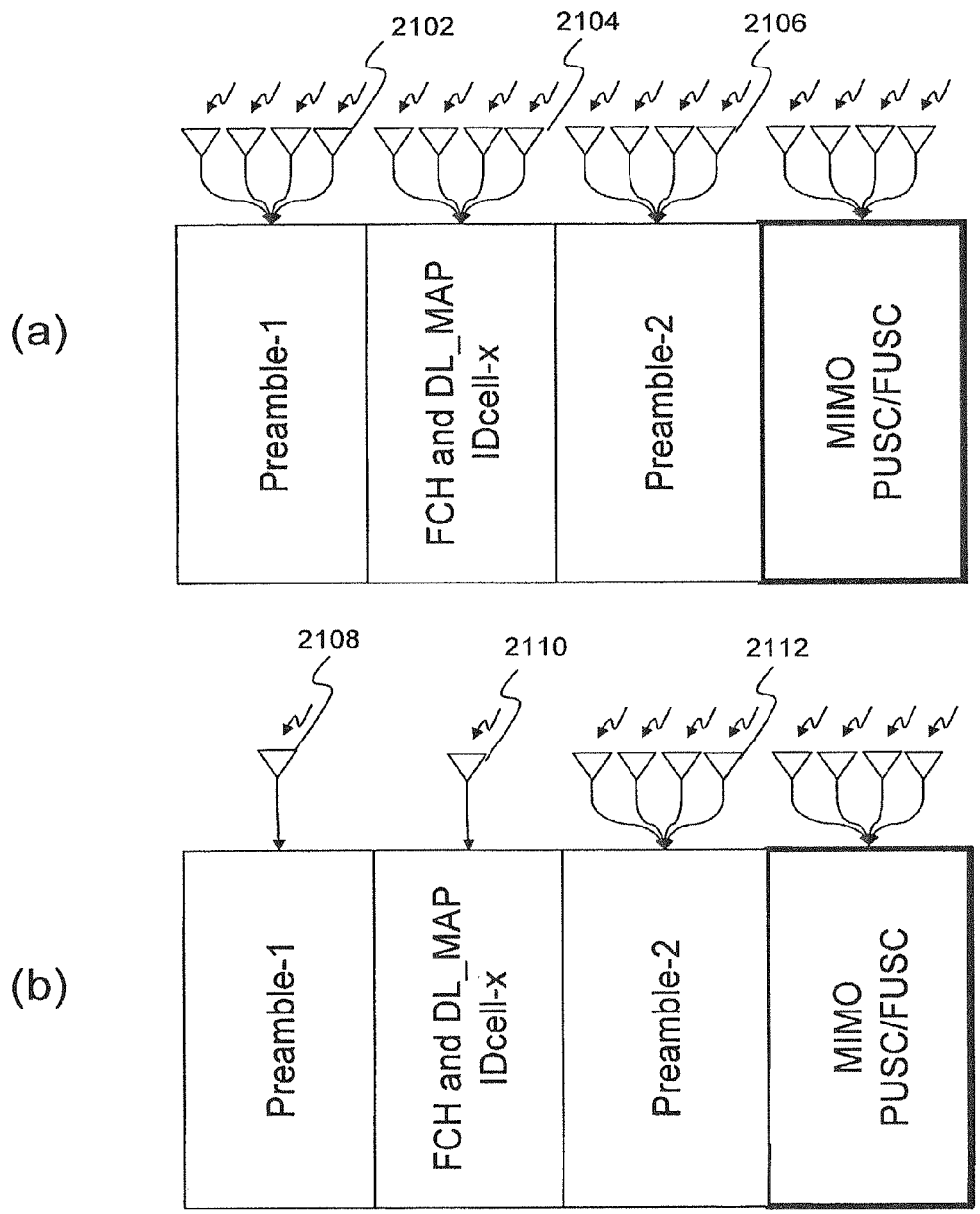
FIG. 21 (a) shows an example for search and demodulation of Preamble-1 and DL_MAP by multiple antennas.

FIG. 21 illustrates the operation arrangement at the receiving antenna.

In FIG. 21 (*a*) Preamble-1 and DL_MAP may be searched and demodulated by a plurality of antennas 2102, 2104. In another embodiment as shown in FIG. 21 (*b*), Preamble-1 may be searched by single receive antenna 2108, the other receive antennas may be used to search other frequencies. DL_MAP can be demodulated by single receive antenna 2110, the other receive antennas may be used to demodulate other BS DL_MAP. In both embodiments, Preamble-2 is detected by multiple antennas 2106 to ensure robustness.

Figure 22:
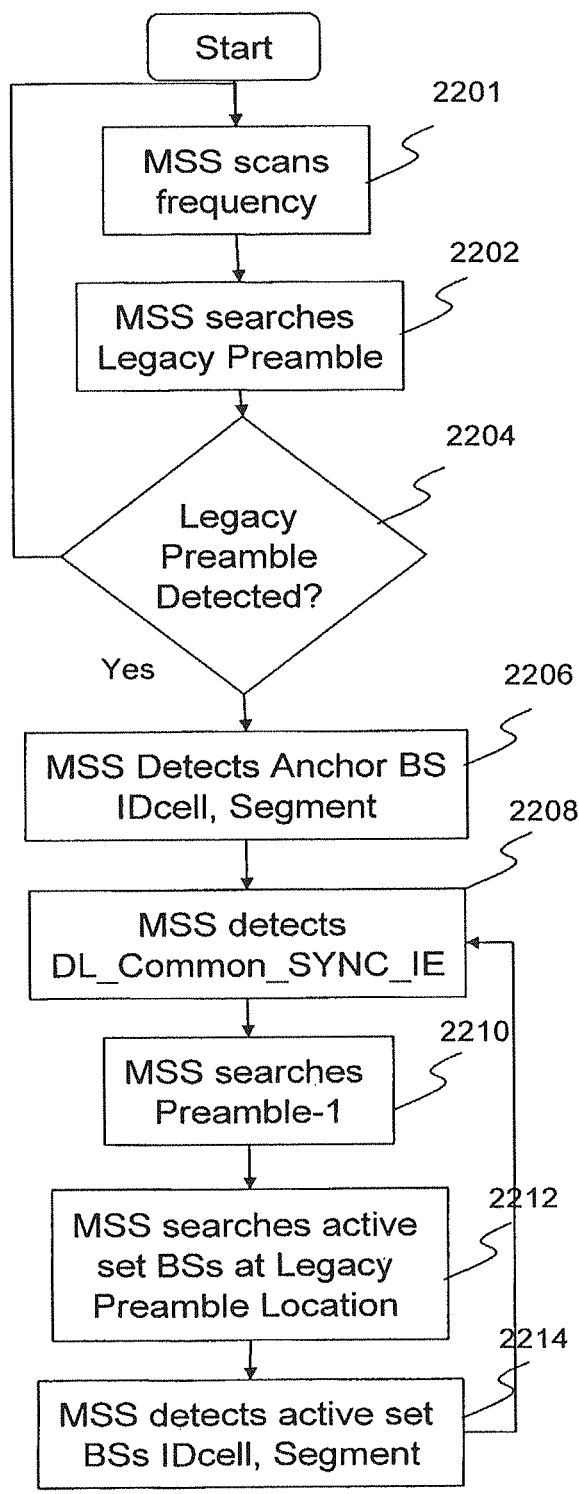
FIG. 22 shows an exemplary flowchart of search and detection of base stations using an embodiment of the present invention.

FIG. 22 is an exemplary flow chart of a method to detect legacy preamble and Preamble-1 at the subscriber station. The mobile subscriber station (MSS) first scans the frequency 2201, then searches legacy preamble 2202, if a legacy preamble is found at 2204, the subscriber station detects the anchor base station, its IDcell and the segment at 2206. At step 2208, the subscriber station detects an information element, for example, DC_Common_SYNC_IE, based on the information in DC_Common_Sync_IE, the subscriber station searches Preamble 1 2210, the subscriber station then searches legacy preamble location for the base stations on the active set 2212, subscriber station then detects the IDcell and segment for the other base stations on the active set 2214.

Figure 23:
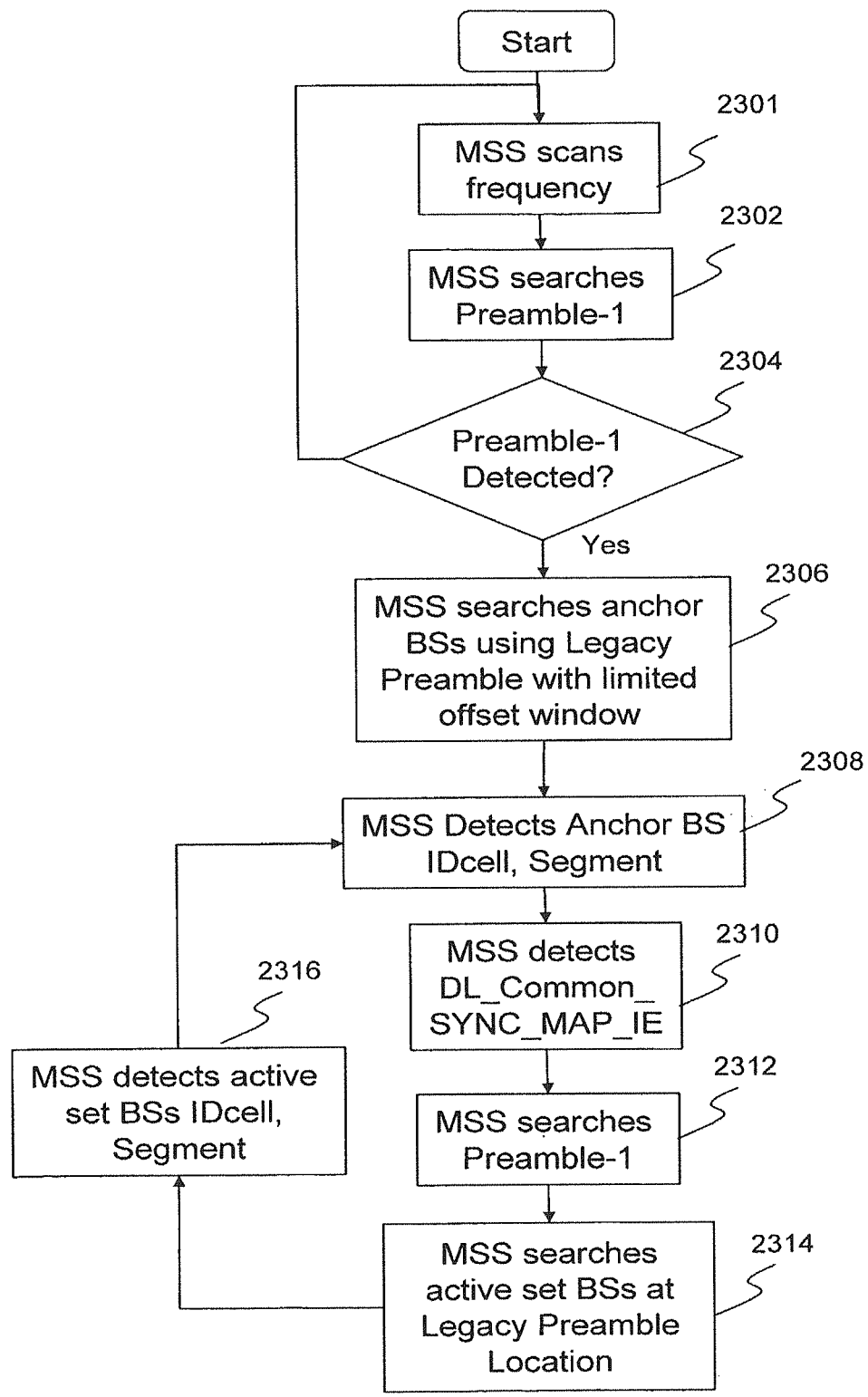
FIG. 23 shows another exemplary flowchart of search and detection of base stations using an embodiment of the present invention.

In FIG. 23, the subscriber station first scans the frequency 2301 and then searches the Preamble-1 first 2302, when it detects a Preamble-1 2304, it searches the anchor base station using the legacy preamble within the limited search window 2306, and detects the anchor base station's IDcell and segment 2308. The subscriber station then detects an information element, for example, the DL_Common_Sync_Map_IE in DL_MAP 2310, the subscriber station then searches for Preamble-1 2312, subscriber station then searches active base stations at legacy preamble locations 2314, and detects the IDcell and the segment for the base stations on the active set.

The present invention enables fast cell search which is important to soft handover and fast cell selection in a mobile broadband wireless access system; supports channel estimation and channel quality measurement for multiple antennas; allows better and simpler initial access based on the repetitive structure of the preambles. The present invention further provides flexibility by supporting both two symbols based preamble and single symbol based preamble; reduces the subcarrier separation for channel estimation, for example in MIMO systems; and increases the length of cell specific codes which is important for small FFT sizes. The present invention further provides non-overlapping allocation of subcarriers to multiple antennas, with no interference between different antennas; supports frequency domain fine frequency synchronization for two symbols based preamble; supports MIMO and non-MIMO subscriber stations and allows transmit antenna identification.

What is claimed is:

1. A system for accessing an orthogonal frequency division multiplexing access (OFDMA) system comprising:
a base station including a base station processor and transmit circuitry, wherein:
the base station processor constructs at least one OFDMA frame having a first preamble and a second preamble, the first preamble having a common synchronization channel comprising common synchronization subcarriers, the common synchronization subcarriers carrying a common sequence, and the second preamble comprising a base station specific preamble; the first preamble further including other signaling information pertaining to the configuration of the second preamble,
the base station processor assigns said first preamble for use in a plurality of base stations, and
the transmit circuitry transmits said at least one OFDMA frame; and
a subscriber station including a subscriber station processor and receive circuitry, wherein:
the receive circuitry receives said at least one OFDMA frame from the base station;
the subscriber station processor detects said at least one OFDMA frame; and
the subscriber station processor performs synchronization using the common sequence of the first preamble, and identifying candidate timing synchronization positions using a correlation of the common sequence, and searching for the second preamble using the candidate timing synchronization positions.

2. The system according to claim 1, wherein said common sequence has a repeated time domain structure.

3. The system according to claim 1, wherein said common synchronization subcarriers comprise a common pseudo-noise code.

4. The system according to claim 1, wherein the length of said common sequence is scalable with a bandwidth of a channel, thus providing same synchronization performance for all bandwidth.

5. The system according to claim 1, wherein said first preamble is located in a zone comprising a first dimension of subchannels and a second dimension of time division and multiplex OFDM symbols, said zone being defined by a subcarrier allocation method.

6. The system according to claim 1, wherein said first preamble is located in one of a fully utilized subchannel (FUSC) zone or a partially utilized subchannel (PUSC) zone.

7. The system according to claim 1, wherein said common synchronization subcarriers are separated by null-subcarriers.

8. The system according to claim 1, wherein said OFDMA system is one of the following: single-input, single-output (SISO) system, multiple-input, single-output (MISO) system, and a multiple-input, multiple-output (MIMO) system.

9. The system according to claim 1, wherein said OFDMA system is a multi-input, single-output (MISO) system, and the base station processor further transmits said first preamble in a cyclic delay diversity (CDD) on a plurality of transmitting antennas.

10. The system according to claim 1, wherein said first preamble is at a flexible location being indicated by a preceding zone in said at least one OFDMA frame.

11. The system according to claim 1, wherein said OFDMA system is multiple-input, multiple-output (MIMO) system, and the base station processor further assigns cell-specific synchronization subcarriers of said base station specific preamble to a plurality of antennas according to a predefined antenna mapping pattern.

12. The system according to claim 1, wherein said first preamble or said second preamble coexists with a legacy preamble.

13. The system according to claim 1, wherein said at least one OFDMA frame has a plurality of second preambles.

14. A base station in an orthogonal frequency division multiplexing access (OFDMA) system comprising:
a base station processor constructing at least one OFDMA frame having a first preamble and a second preamble, the first preamble having a common synchronization channel comprising common synchronization subcarriers, the common synchronization subcarriers for carrying a common sequence, and the second preamble comprising a base station specific preamble, the first preamble further including other signaling information pertaining to the configuration of the second preamble; and
transmit circuitry transmitting the at least one OFDMA frame, the at least one OFDMA frame configured such that a subscriber station would be able to perform synchronization using the common sequence of the first preamble, identify candidate timing synchronization positions using a correlation of the common sequence, and search for the second preamble using the candidate timing synchronization positions.

15. The base station according to claim 14, wherein the length of said common sequence is scalable with a bandwidth of a channel, thus providing same synchronization performance for all bandwidth.

16. The base station according to claim 14, wherein said first preamble is located in a zone comprising a first dimension of subchannels and a second dimension of time division and multiplex OFDM symbols, said zone being defined by a subcarrier allocation method.

17. The base station according to claim 14, wherein the other signaling information comprises either the number of antennas used in the second preamble or information specifying whether an operation mode of the second preamble is PUSC or FUSC.

18. A subscriber station in an orthogonal frequency division multiplexing access (OFDMA) system comprising:

receive circuitry receiving at least one OFDMA frame, the at least one OFDMA frame having a first preamble and a second preamble, the first preamble having a common synchronization channel comprising common synchronization subcarriers, the common synchronization subcarriers carrying a common sequence, and the second preamble comprising a base station specific preamble, the first preamble further including other signaling information pertaining to the configuration of the second preamble; and a subscriber station processor performing synchronization by using the common sequence of the first preamble, and identifying candidate timing synchronization positions using a correlation of the common sequence, and searching for the second preamble using the candidate timing synchronization positions.

19. The subscriber station according to claim 18, wherein the length of said common sequence is scalable with a bandwidth of a channel, thus providing same synchronization performance for all bandwidth.

20. The subscriber station according to claim 18, wherein said first preamble is located in a zone comprising a first dimension of subchannels and a second dimension of time division and multiplex OFDM symbols, said zone being defined by a subcarrier allocation method.

* * * * *

UNITED STATES PATENT AND TRADEMARK OFFICE
CERTIFICATE OF CORRECTION

PATENT NO. : 9,832,063 B2  
APPLICATION NO. : 13/680173  
DATED : November 28, 2017  
INVENTOR(S) : Ma et al.

Page 1 of 1

It is certified that error appears in the above-identified patent and that said Letters Patent is hereby corrected as shown below:

On the Title Page

Item (60) should be replaced with the following Line:
"Continuation of application No.13/114,579, filed on May 24, 2011, now Pat. No. 8,340,072, which is a division of application No. 11/630,474, filed on Jul. 23, 2007, now Pat. No. 7,961,696, which is a national stage entry of application No. PCT/CA2005/000987, filed on Jun. 23, 2005."

Signed and Sealed this
Twenty-eighth Day of May, 2019

Andrei Iancu
*Director of the United States Patent and Trademark Office*